United States Patent
Na et al.

(10) Patent No.: US 11,966,624 B2
(45) Date of Patent: Apr. 23, 2024

(54) STORAGE DEVICE AND OPERATING METHOD THEREOF

(71) Applicant: Samsung Electronics Co., Ltd., Suwon-si (KR)

(72) Inventors: Jongsung Na, Hwaseong-si (KR); Youngseop Shim, Seoul (KR); Kyungduk Lee, Seongnam-si (KR); Sangho Yi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 17/720,141

(22) Filed: Apr. 13, 2022

(65) Prior Publication Data

US 2023/0071289 A1 Mar. 9, 2023

(30) Foreign Application Priority Data

Sep. 6, 2021 (KR) .................. 10-2021-0118549

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,116,622 B2 | 8/2015 | Suzuki et al. | |
| 9,207,749 B2 | 12/2015 | Diamant et al. | |
| 9,619,478 B1* | 4/2017 | Singh | G06F 11/3476 |
| 10,120,608 B2 | 11/2018 | Khan et al. | |
| 10,635,324 B1 | 4/2020 | Klein et al. | |
| 10,956,346 B1 | 3/2021 | Ben-Yehuda et al. | |
| 2016/0094619 A1 | 3/2016 | Khan et al. | |
| 2017/0357462 A1* | 12/2017 | Walker | G06F 3/0683 |
| 2019/0155682 A1 | 5/2019 | Sinha et al. | |
| 2020/0050382 A1 | 2/2020 | Dain et al. | |
| 2020/0394559 A1* | 12/2020 | Zhang | G06N 3/045 |
| 2021/0203992 A1* | 7/2021 | Xu | H04N 19/44 |

FOREIGN PATENT DOCUMENTS

JP 5882467 B2 3/2016

OTHER PUBLICATIONS

Extended European Search Report dated Nov. 22, 2022 for corresponding EP Patent Application No. 22176468.1.
NVMe Specification 1.3, May 1, 2017.
NVMe Specification 1.4, Jun. 10, 2019.

* cited by examiner

*Primary Examiner* — Daniel D Tsui
(74) *Attorney, Agent, or Firm* — Muir Patent Law, PLLC

(57) ABSTRACT

A storage device and an operating method thereof are provided. The storage device includes a memory configured to store parameter data used as an input in a neural network. The storage device also includes a storage controller configured to receive a request signal from a host. The storage controller is also configured to encode, based on the parameter data, log data in the neural network, the log data indicating contexts of the plurality of components, and transmit the encoded log data to the host.

16 Claims, 14 Drawing Sheets

STORAGE DEVICE AND OPERATING METHOD THEREOF

CROSS-REFERENCE TO RELATED APPLICATION

This application is based on and claims priority under 35 U.S.C. § 119 to Korean Patent Application No. 10-2021-0118549, filed on Sep. 6, 2021, in the Korean Intellectual Property Office, the disclosure of which is incorporated by reference herein in its entirety.

BACKGROUND

The technical aspects of the disclosure relate to an electronic device, and more particularly, to a storage device and an operating method thereof.

A representative example of a flash memory-based mass storage device is a solid state drive (SSD). With the explosive increase in demand for SSD, their uses are diversifying. The SSD is required to be managed and maintained to provide high reliability and best possible quality of service.

During the operation of the SSD, unexpected failures or errors may occur due to hardware or software problems. In such events, the SSD collects a state at the time point when an error or failure occurs and stores the state as dump data. The collected dump data is transmitted to a host to which the SSD is connected. The dump data transmitted to the host is provided to a debugging tool or a debugging device, and dump data-based debugging is performed.

As the capacity and complexity of the SSD increase, the size of dump data also increases. In particular, the collection and extraction of dump data as large as possible for detailed failure analysis are required. As a result, transmission of dump data to a debugging channel provided for failure analysis of the SSD causes difficulties in rapid analysis due to the limitation of the transmission speed. Therefore, it is difficult to perform accurate debugging of the SSD by rapidly acquiring real-time state information at the time point when a failure or error occurs.

SUMMARY

The technical aspects of the disclosure provide a storage device that provides log data compressed in size to a host, and an operating method thereof.

According to a technical aspect of the disclosure, there is provided a storage device including a plurality of components, the storage device comprising a memory configured to store parameter data used as an input in a neural network; and a storage controller configured to receive a request signal from a host, encode, based on the stored parameter data, log data in the neural network, the log data indicating contexts of the plurality of components, and transmit the encoded log data to the host.

According to another technical aspect of the disclosure, there is provided a storage device including a plurality of components, the storage device comprising a memory configured to store parameter data used as an input in a neural network; and a storage controller configured to generate log data for contexts of the plurality of components, encode, based on the parameter data, the log data in the neural network, and control the memory to store the encoded log data.

According to another technical aspect of the disclosure, there is provided a storage device including a plurality of components, the storage device comprising a first memory configured to store log data for contexts of the plurality of components; a second memory configured to store parameter data used as an input in a neural network; and a storage controller configured to receive a request signal from a host, encode, based on the parameter data, the log data in the neural network, and transmit the encoded log data to the host.

According to another technical aspect of the disclosure, there is provided a method of operating a storage device including a plurality of components, the method comprising a receiving operation of receiving a Get log page command provided from a host; a generating operation of generating log data for contexts of each of the plurality of components in response to the Get log page command; an encoding operation of encoding the log data in a neural network based on pre-stored parameter data; and a transmission operation of transmitting the encoded log data to the host.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the disclosure will be described in detail with reference to the accompanying drawings.

Figure 1:
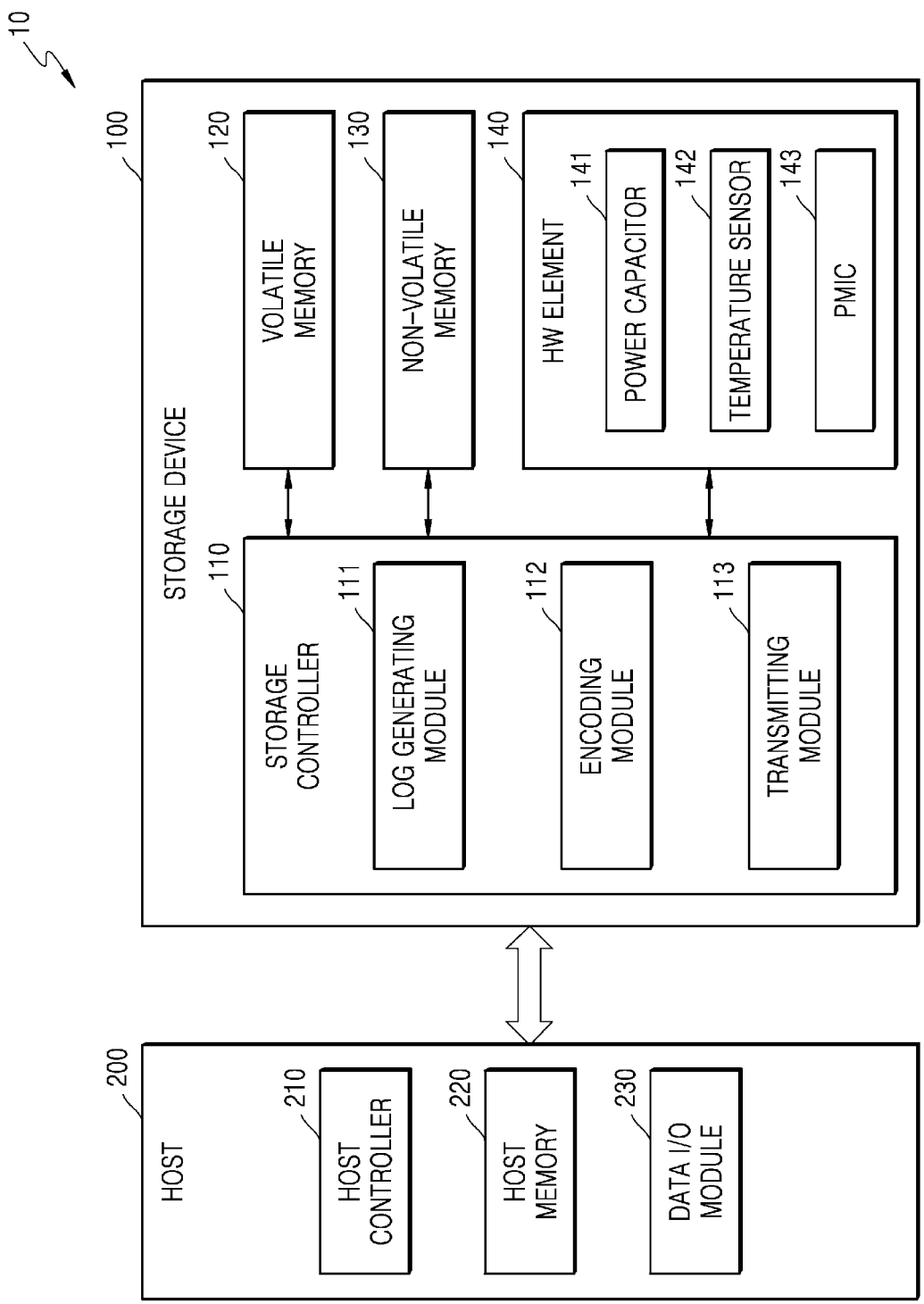
FIG. 1 is a diagram for describing a storage system according to an embodiment of the disclosure.

FIG. 1 is a diagram for describing a storage system according to an embodiment of the disclosure.

Referring to FIG. 1, a storage system 10 may include a storage device 100 and a host 200.

The storage device 100 and other storage devices described in the various embodiments and descriptions herein, may be composed of a plurality of components. A component may be implemented in the storage device 100 in a hardware form, in a software form, or in a hardware and software form. A component in this specification may be referred to as an element. Referring to FIG. 1, for example, the storage device 100 may include components, such as a storage controller 110, a volatile memory 120, a non-volatile memory 130, and a hardware element 140. However, the embodiment of the disclosure is not limited thereto.

The storage device 100 may include storage media for storing data according to a request from the host 200. As an example, the storage device 100 may include at least one of a solid state drive (SSD), an embedded memory, and a removable external memory. When the storage device 100 is an SSD, the storage device 100 may be a device conforming to a Non-Volatile Memory express (NVMe) specifications. If the storage device 100 is an embedded memory or an external memory, the storage device 100 may be a device conforming to universal flash storage (UFS) or embedded multi-media card (eMMC) specification. The host 200 and the storage device 100 may generate and transmit a packet according to an adopted standard protocol, respectively.

The storage controller 110 may control the overall operation of the storage device 100. The storage controller 110 herein may also be referred to as a controller, a device controller, or a memory controller.

When power is applied to the storage device 100 from the outside, the storage controller 110 may execute firmware. When the non-volatile memory 130 is a flash memory device, the firmware may include a host interface layer (HIL), a flash translation layer (FTL), and a flash interface layer (FIL).

The storage controller 110 may control the volatile memory 120 or the non-volatile memory 130 to perform a program operation (or write operation), a read operation, and an erase operation, respectively in response to a write request, a read request, and an erase request from the host 200.

During a program operation, the storage controller 110 may provide a program command, a physical address, and write data to the non-volatile memory 130. During a read operation, the storage controller 110 may provide a read command and a physical address to the non-volatile memory 130. During an erase operation, the storage controller 110 may provide an erase command and a physical address to the non-volatile memory 130.

The storage controller 110 may transmit a command, address, and data generated by itself to the non-volatile memory 130 regardless of a request provided from the host 200. For example, the storage controller 110 may generate a command, an address, and data for performing a background operation, and provide the generated command, address, and data to the non-volatile memory 130. The background operation may be, for example, wear leveling, read reclaim, or garbage collection.

The storage controller 110 may logically control a plurality of non-volatile memories 130 operating as one non-volatile memory 130.

In an embodiment, the storage controller 110 may receive a request signal from the host 200. The request signal may be, for example, a Get log page command. The Get log page command may be a command for requesting log data stored in the storage device 100. This Get log page command is defined in the Non-Volatile Memory express (NVMe) standard. The log data may be data representing information on the current context of at least one component. The context may include, for example, a state of the component, a status or condition relating to the component, a particular parameter associated with the component, or the like. In some cases, the context may refer to information about a set of categories of data about a component, as depicted and described in greater detail below in connection with FIGS. 5 and 6, for example. For example, the log data may include information on the current context of each of the storage controller 110, the volatile memory 120, the non-volatile memory 130, and the hardware element 140. However, the log data is not limited thereto. Such log data may be unstructured data, for example, data expressed in binary numbers as data in a format readable by a computer (or machine). When the request signal is transmitted to the storage controller 110, the storage controller 110 may encode log data based on parameter data in a neural network. The neural network may be implemented as, for example, a Convolutional Neural Network (CNN), a Recurrent Neural Network (RNN), a Deep Residual Network (DRN), a Deep Feedforward Network (DFN), or an Autoencoder. The parameter data may be data representing a parameter used as an input in a neural network. For example, the parameter data may include a parameter corresponding to the context of the storage controller 110, a parameter corresponding to the context of the volatile memory 120, a parameter corresponding to the context of the non-volatile memory 130, and a parameter corresponding to the context of the hardware element 140. However, the parameter data is not limited thereto. Such parameter data may be previously learned and stored in the non-volatile memory 130.

In the present specification, encoding log data may mean compressing the size of data in a lossy compression method. The lossy compression method may mean displaying data differently from the original by compressing and decompressing data at a data receiving location. The lossy compression method may be a method of expressing main data through mathematical modeling or a prediction algorithm, transforming and quantizing an error value, and transmitting data. The lossy compression method may be a method of losing high-frequency components of the data, color difference information, and the like.

In another embodiment, the storage controller 110 may control the volatile memory 120 or the non-volatile memory 130 to generate log data, encode the log data based on parameter data in a neural network, and store the encoded log data.

In another embodiment, the storage controller 110 may receive a request signal from the host 200, encode log data based on the parameter data in the neural network, and transmit the encoded log data to the host 200.

According to an embodiment, the storage controller 110 may include a log generating module 111, an encoding module 112, and a transmitting module 113. The log generating module 111, the encoding module 112, and the transmitting module 113 may be implemented in hardware, or may be implemented in hardware and software. In an embodiment, the log generating module 111, the encoding module 112, and the transmitting module 113 may be implemented in firmware.

In one embodiment, the log generating module 111 may generate log data in response to the request signal.

In another embodiment, the log generating module 111 may generate log data corresponding to the current context of each of the plurality of components included in the storage device 100.

In another embodiment, the log generating module 111 may generate log data corresponding to the current context of each of the plurality of components and control the first memory to store the log data in response to the request signal. Here, the first memory may be, for example, the volatile memory 120.

In an embodiment, the encoding module 112 may calculate a latent vector based on the parameter data and log data, and output data representing the latent vector as encoded log data.

In another embodiment, the encoding module 112 may compute a latent vector based on parameter data and log data using a neural network, and control the non-volatile memory 130 to store data representing the latent vector as encoded log data.

In another embodiment, the encoding module 112 may load log data from the first memory, load parameter data from the second memory, calculate a latent vector based on the loaded parameter data and the loaded log data, and output data representing the latent vector as encoded log data. Here, the first memory may be, for example, the volatile memory 120, and the second memory may be, for example, the non-volatile memory 130.

The encoding module 112 according to the embodiment may be implemented as an accelerator.

The transmitting module 113 may transmit encoded log data to the host 200 through an interface (e.g., NVMe, NVMe Management Interface (MI), or NVMe-Over Fabrics (oF)).

In FIG. 1, the log generating module 111, the encoding module 112, and the transmitting module 113 are included in the storage controller 100, but the embodiment of the disclosure is not limited thereto. In particular, the log generating module 111, the encoding module 112, and the transmitting module 113 may be included in a processor implemented separately from the storage controller 100.

The volatile memory 120 may operate in response to the control of the storage controller 110 only while receiving power. The volatile memory 120 may temporarily store data provided from the host 200 or data provided from the non-volatile memory 130 only while receiving power. The volatile memory 120 may be included in the storage controller 110 or arranged outside the storage controller 110 as a buffer memory. For example, the volatile memory 120 may include dynamic random-access memory (DRAM), static random-access memory (SRAM), or the like.

In an embodiment, the volatile memory 120 may store log data before the log data is encoded.

The non-volatile memory 130 may operate in response to the control of the storage controller 110. In particular, the non-volatile memory 130 may receive a command and an address from the storage controller 110, and access a memory cell selected by an address among memory cells (not shown). The non-volatile memory 130 may perform an operation indicated by a command on a memory cell selected by an address.

The command may be, for example, a program command, a read command, or an erase command, and the operation indicated by the command may be, for example, a program operation (or write operation), a read operation, or an erase operation. The program operation may be an operation in which the non-volatile memory 130 stores data provided from the host 200 in response to the control of the storage controller 110. The read operation may be an operation in which the non-volatile memory 130 reads read data stored in the non-volatile memory 130 in response to the control of the storage controller 110. The erase operation may be an operation in which the non-volatile memory 130 erases data stored in the memory device in response to the control of the storage controller 110.

According to an embodiment, the non-volatile memory 130 may be implemented as a single chip or memory die, or as a plurality of memory chips or a plurality of memory dies. For example, each of the plurality of memory chips may be a Dual Die Package (DDP), a Quadruple Die Package (QDP), or an Octuple Die Package (ODP).

As an example, the non-volatile memory 130 may be, for example, a flash memory. The flash memory may include, for example, a NAND flash memory, a NOR flash memory, or the like. When the non-volatile memory 130 includes flash memory, the flash memory may include a 2D NAND memory array or a 3D (or vertical) NAND (VNAND) memory array.

As another example, the storage device 100 may include other various types of non-volatile memories. For example, a magnetic RAM (MRAM), a spin-transfer torque MRAM, a conductive bridging RAM (CBRAM), a ferroelectric RAM (FeRAM), a Phase RAM (PRAM), a resistive RAM, and other various types of memory may be applied to the storage device 100.

In an embodiment, the non-volatile memory 130 may store encoded log data. The size of the encoded log data may be less than the size of the unencoded log data. For example, if the size of unencoded log data is 32 megabytes (MB), the size of the encoded log data may be less than 32 MB. However, the embodiment of the disclosure is not limited thereto.

In an embodiment, the non-volatile memory 130 may store parameter data.

The number of non-volatile memory 130 is plural, and a separate non-volatile memory storing only log data among the plurality of non-volatile memories may be provided in the storage device 100.

The hardware element 140 may include a power capacitor 141, a temperature sensor 142, and a Power Management Integrated Circuit (PMIC) 143. However, the embodiment of the disclosure is not limited thereto. The power capacitor 141 may store backup power. The temperature sensor 142 may sense an internal temperature of the storage device 100. The PMIC 143 may manage power supplied from the outside.

The host 200 may communicate with the storage device 100 through an interface. Here, the interface may be implemented as, for example, NVMe, NVMe MI, or NVMe-Of.

In an embodiment, the host 200 may provide a write request to the storage device 100 for requesting to store data in the storage device 100. Also, the host 200 may provide a write request, data, and a logical address for identifying data to the storage device 100. The storage device 100 may store write data including data and metadata provided by the host 200 in the non-volatile memory 130 in response to the write request provided from the host 200, and provide a response indicating that the storage is complete to the host 200.

In another embodiment, the host 200 may provide a request signal to the storage device 100. Here, the request signal may be a Get log page command.

The host 200 may include a host controller 210, a host memory 220, and a data input/output (I/O) module 230. The host controller 210 may control the overall operation of the host 200. The host memory 220 may function as a buffer memory for temporarily storing data to be transmitted to the storage device 100 or data transmitted from the storage device 100. The data I/O module 230 may transmit data stored in the host memory 220 to the storage device 100 or receive data to be stored in the host memory 220 from the storage device 100.

Figure 2:
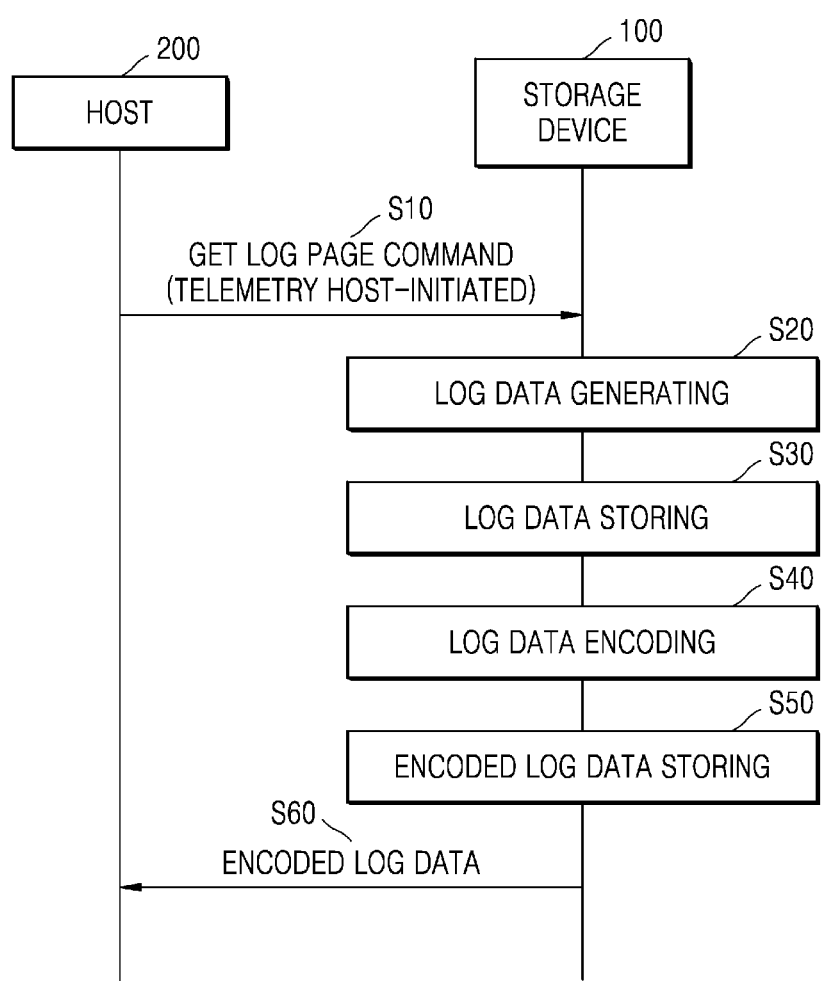
FIG. 2 is a diagram for describing a method of operating a storage system according to an example embodiment of the disclosure.

FIG. 2 is a diagram for describing a method of operating a storage system according to an example embodiment of the disclosure.

Referring to FIG. 2, operation S10 may be referred to as a receiving operation. In operation S10, the host 200 transmits a Get log page command to the storage device 100. And the storage device 100 receives the Get log page command. The Get log page command may include bit information (or bit value) corresponding to telemetry initiated by the host 200. As used herein, the term "telemetry host-initiated" may indicate that the host 200 initiates telemetry. Telemetry host-initiated is defined in the NVMe standard (e.g., 5.16.18 based on NVMe standard 2.0a). This will be described later with reference to FIG. 3.

Operation S20 may be referred to as a generating operation. In operation S20, the storage device 100 generates log data for contexts of each of the plurality of components in response to the Get log page command. For example, the storage device 100 takes a snapshot of the current context and generates log data indicating the snapshot of the current context. In particular, for example, the storage device 100 may generate log data for the context of NAND memory devices, log data for the context of DRAM memory devices, log data for the context of power with respect the storage device 100, and log data for the context of Peripheral Component Interconnection express (PCIe) with respect to the storage device 100. However, the embodiment of the disclosure is not limited thereto.

Operation S30 may be referred to as a log data storage operation. In operation S30, the storage device 100 stores the generated log data in the first memory (e.g., the volatile memory 120 shown in FIG. 1).

Operation S40 may be referred to as an encoding operation. In operation S40, the storage device 100 encodes the log data in the neural network based on pre-stored parameter data. In particular, for example, the storage device 100 performs a matrix multiplication operation on the parameter data and log data, generates one matrix including the result of the matrix multiplication operation as an element, and calculates a latent vector by performing a pooling operation on elements included in the same row in one matrix, and outputs data representing the latent vector as encoded log data. An embodiment thereof will be described later with reference to FIGS. 8 and 9.

Operation S50 may be referred to as an encoded log data storage operation. In operation S50, the storage device 100 stores the encoded log data in the first memory (e.g., the non-volatile memory 130 shown in FIG. 1).

Operation S60 may be referred to as a transmission operation. In operation S60, the storage device 100 transmits the encoded log data to the host 200.

Figure 3:
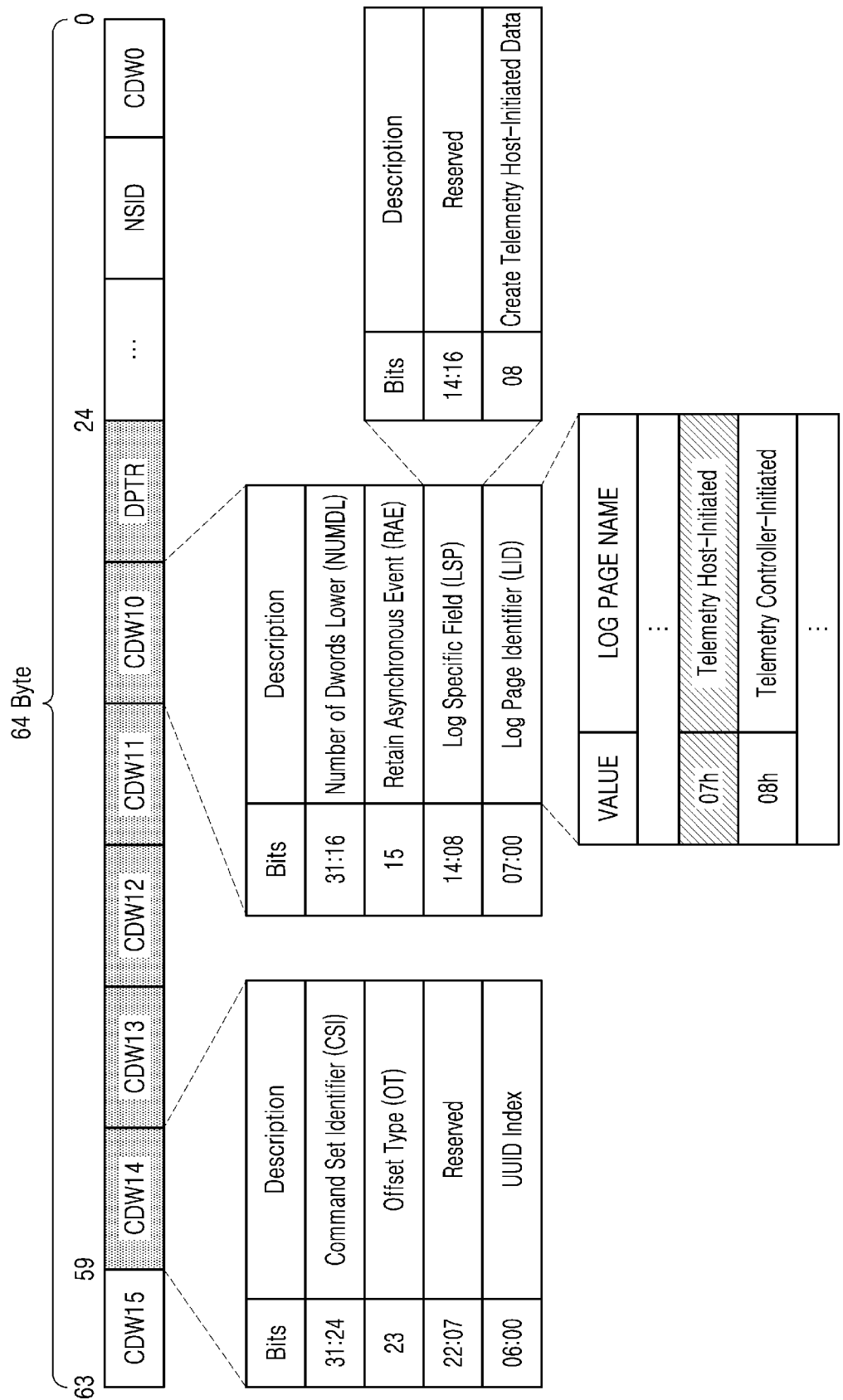
FIG. 3 is a diagram for explaining a command provided by a host according to an embodiment of the disclosure.

FIG. 3 is a diagram for explaining a command provided by a host according to an embodiment of the disclosure.

Referring to FIG. 3, the command provided by the host 200 may be the aforementioned request signal. The command provided by the host 200 may be a command defined in the NVMe standard, and the command queue entry may be a submission queue entry defined in the NVMe standard. The size of the command provided by the host 200 may be 64 bytes. The command provided by the host 200 may be composed of, for example, 16 command double words. One command double word may be data having a size of 4 bytes.

According to an embodiment, the command provided by the host 200 may include command double word 0 CDW 0, a namespace Identifier NSID, a data pointer DPTR, command double word 10 CDW 10, command double word 11 CDW 11, command double word 12 CDW 12, command double word 13 CDW 13, command double word 14 CDW 14, and command double word 15 CDW 15.

In an embodiment, the Get log page command provided by the host 200 may be a command to which the NVMe standard (e.g., 5.16 in NVMe standard 2.0a) is applied. The Get log page command provided by the host 200 may include a data pointer DPTR, command double word 10 CDW 10, command double word 11 CDW 11, command double word 12 CDW 12, command double word 13 CDW 13, and command double word 14 CDW 14.

The data pointer DPTR may be a field designating data used for a command. The data pointer DPTR may be a field designating a start point of a data buffer in the host memory 220.

The command double word 10 CDW 10 may include a Number of Dwords Lower (NUMDL), a Retain Asynchronous Event (RAE), a Log Specific Field (LSP), and a Log Page Identifier (LID). NUMDL may be a field designating the least significant 16 bits unless otherwise specified. RAE is a field that designates when to keep or clear an asynchronous event, and may have a size of 1 bit. LSP is a field indicating a log defined by LID, and may have a size of 7 bits. LID is a field indicating an identifier of a log page to be searched, and may have a size of 7 bits.

In an embodiment, the LID may indicate bit information corresponding to telemetry host-initiated. Bit information corresponding to telemetry host-initiated may be, for example, "07h".

When the LID includes bit information corresponding to telemetry host-initiated, the LSP may include bit information supporting generation of telemetry host-initiated data. The size of the bit information supporting generating the telemetry host-initiated data may be 1 bit.

The command double word 11 CDW 11 may include a field designating an identifier required for a specific log page and a field designating the most significant 16 bits unless otherwise specified.

The command double word 12 CDW 12 may include a field that specifies where to start returning data within a log page, unless otherwise specified.

The command double word 13 CDW 13 may include a field designating the log page offset or the most significant 32 bits of an index in the list of data structures.

The command double word 14 CDW 14 may include a command set identifier (CSI), an offset type (OT), and a universally unique identifier (UUID) index. The CSI may include bit information corresponding to the NVM command set, bit information corresponding to the key value command set, and bit information corresponding to the zoned namespace command set. The OT may have a first value or a second value. If the OT is the first value, the command double word 12 CDW 12 and the command double word 13 CDW 13 designate the index of the list of data structures in the log page to be returned. If the OT is the second value, the command double word 12 CDW 12 and the command double word 13 CDW 13 designate the byte offset in the log page to be returned.

Although not shown in the drawing, the command provided by the host 200 may further include command double word 2, command double word 3, and a metadata pointer.

Figure 4:
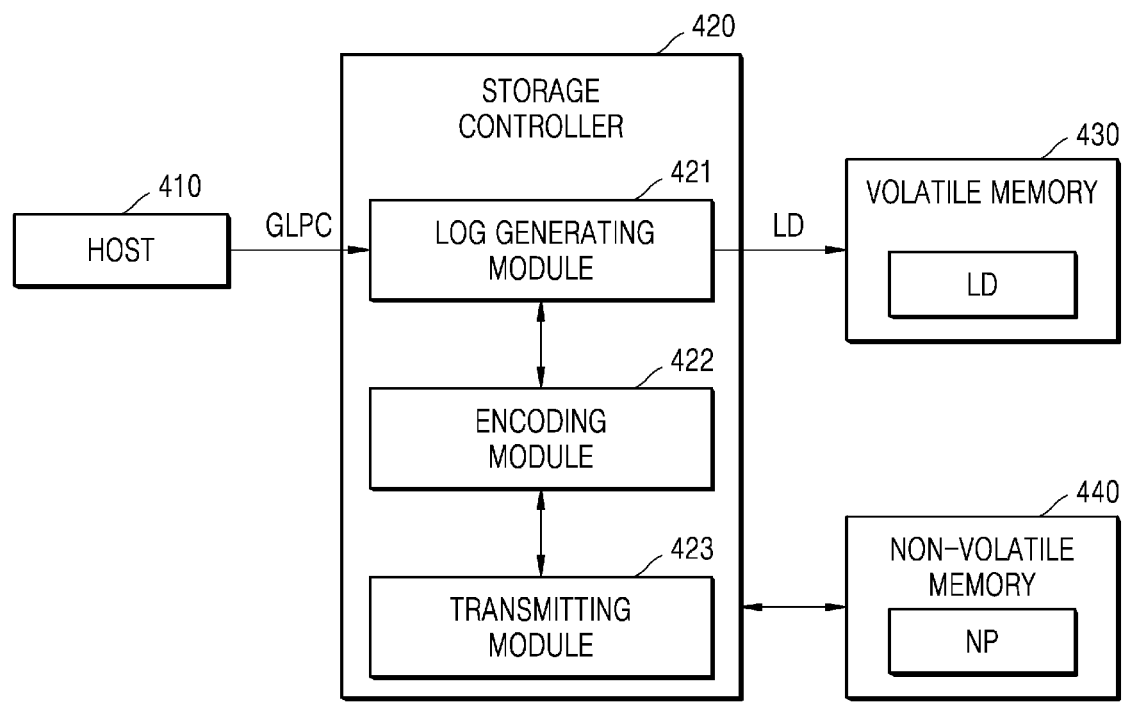
FIG. 4 is a diagram for explaining a method for a storage device to store log data according to an embodiment of the disclosure.

FIG. 4 is a diagram for explaining a method for a storage device to store log data according to an embodiment of the disclosure.

Referring to FIGS. 3 and 4, the host 410 may perform the same function as the host 200 illustrated in FIG. 1. The host 410 may transmit a Get log page command GLPC to the storage controller 420. As described above with reference to FIG. 3, the Get log page command GLPC may include the data pointer DPTR, the command double word 10 CDW 10, the command double word 11 CDW 11, the command double word 12 CDW 12, the command double word 13 CDW 13, and the command double word 14 CDW 14.

The storage controller 420 may include a log generating module 421, an encoding module 422, and a transmitting module 423.

The log generating module 421, the encoding module 422, and the transmitting module 423 are capable of communicating with each other via a bus.

The log generating module 421 may receive the Get log page command GLPC. The log generating module 421 may take a snapshot of the current context in response to a Get log page command GLPC and generate log data LD representing the current context. The log generating module 421 may provide log data LD, a write command, and an address to the volatile memory 430.

The log data LD may be stored in the volatile memory 430. The log data LD may include a log identifier indicating the bit value of the LID, a reason identifier indicating identification information indicating a unique operating condition of the storage controller, and a telemetry host-initiated data block for a telemetry host-initiated log.

The non-volatile memory 440 may store the parameter data NP.

Figure 5:
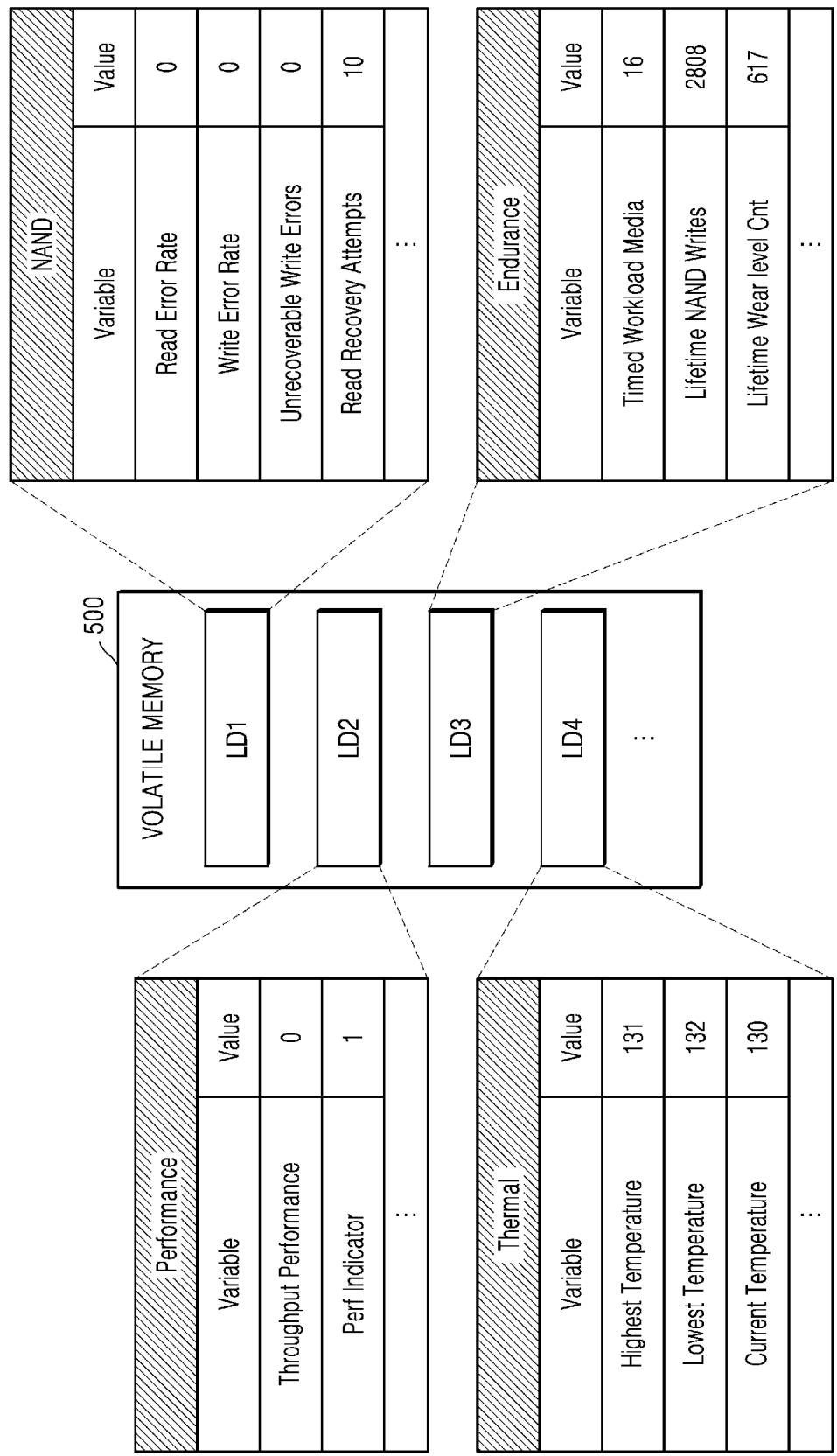
FIG. 5 is a diagram for describing log data stored in a volatile memory according to an embodiment of the disclosure.

FIG. 5 is a diagram for describing log data stored in a volatile memory according to an embodiment of the disclosure.

Referring to FIG. 5, the volatile memory 500 may include a plurality of log data LD1, LD2, LD3, LD4, . . . . Hereinafter, for convenience, the present embodiment will be described based on the first log data LD1, the second log data LD2, the third log data LD3, and the fourth log data LD4. Volatile memory 500 may be an example of volatile memory 430 or other volatile memories disclosed in the varying embodiments of the present application.

Each log data may correspond to the context of a particular component included in a storage device. Referring to FIG. 5, for example, the first log data LD1 may correspond to the context of a NAND memory device, the second log data LD2 may correspond to the context of performance of a storage device (e.g., the storage device of FIG. 4), the third log data LD3 may correspond to a context of durability (endurance) of a storage device (e.g., the storage device of FIG. 4), and the fourth log data LD4 may correspond to a context of thermal information of a storage device (e.g., the storage device of FIG. 4). However, the embodiment of the disclosure is not limited thereto.

When the first log data LD1 is log data for the context of NAND, the context of NAND may include, for example, Read Error Rate, Write Error Rate, Unrecoverable Write Errors, and Read Recovery Attempts. However, the embodiment of the disclosure is not limited thereto. For example, a value of each of Read Error Rate, Write Error Rate, and Unrecoverable Write Errors may be 0, and a value of Read Recovery Attempts may be 10, but the embodiment of the disclosure is not limited thereto.

When the second log data LD2 is log data for a context of performance, the context of the Performance may include, for example, a throughput performance and a perf (performance) indicator. However, the embodiment of the disclosure is not limited thereto. For example, the value of the throughput performance may be 0, and the value of the perf indicator may be 1. However, the embodiment of the disclosure is not limited thereto.

When the third log data LD3 is log data for the context of durability (endurance), the context of Endurance may include, for example, Timed Workload Media, Lifetime NAND Writes, and Lifetime Wear level Cnt. However, the embodiment of the disclosure is not limited thereto. For example, a value of Timed Workload Media may be 16, a value of Lifetime NAND Writes may be 2808, and a value of Lifetime Wear level Cnt may be 617. However, the embodiment of the disclosure is not limited thereto.

When the fourth log data LD4 is log data for the context of thermal information, the context of Thermal may include, for example, Highest Temperature, Lowest Temperature, and Current Temperature. However, the embodiment of the disclosure is not limited thereto. For example, the value of the Highest Temperature may be 131, the value of the Lowest Temperature may be 131, and the value of the Current Temperature may be 130. However, the embodiment of the disclosure is not limited thereto.

Figure 6:
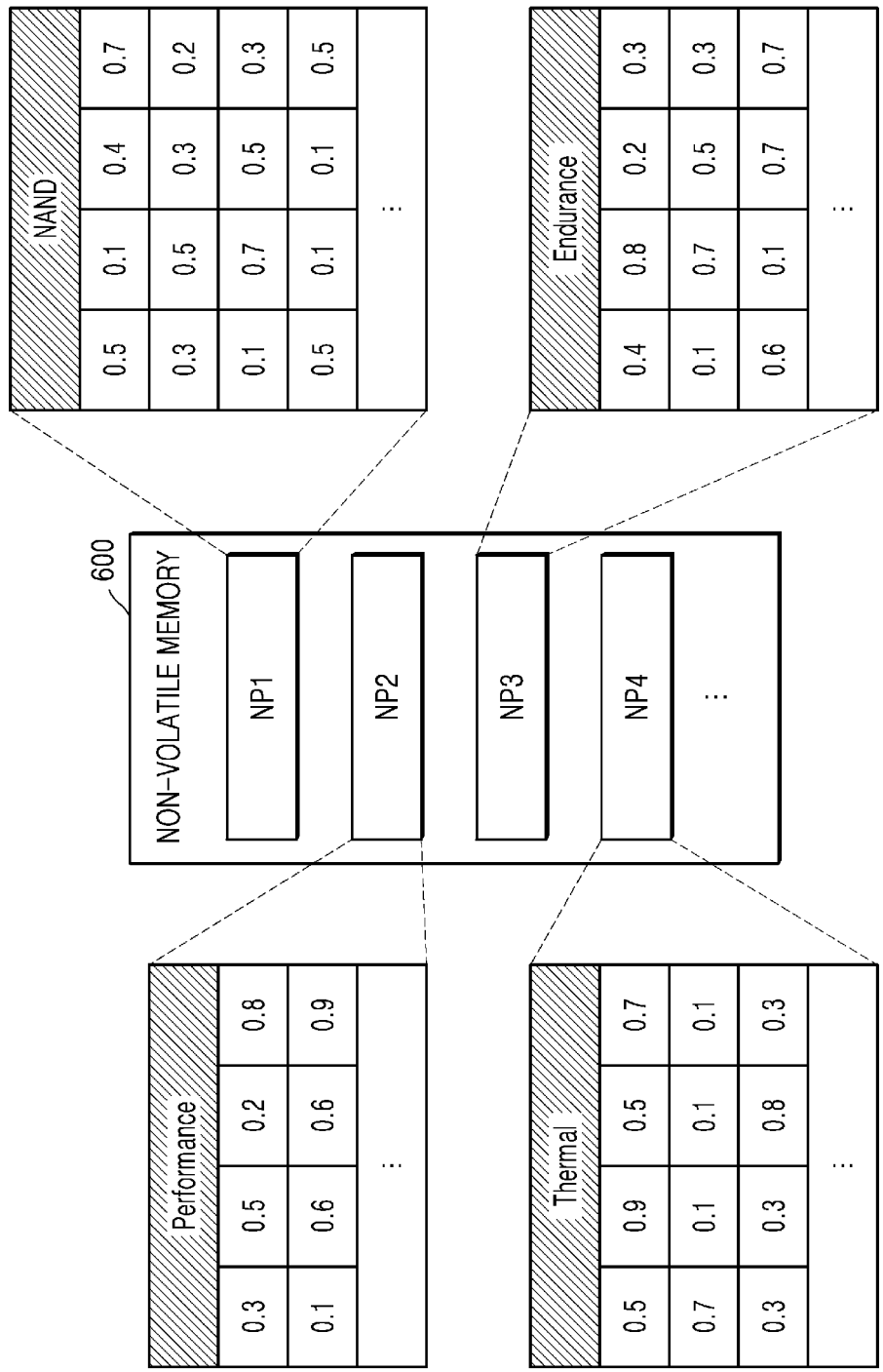
FIG. 6 is a diagram for describing parameter data stored in a non-volatile memory according to an embodiment of the disclosure.

FIG. 6 is a diagram for describing parameter data stored in a non-volatile memory according to an embodiment of the disclosure.

Referring to FIG. 6, the non-volatile memory 600 may include a plurality of parameter data NP1, NP2, NP3, NP4, . . . . Hereinafter, for convenience, the present embodiment will be described with reference to the first parameter data NP1, the second parameter data NP2, the third parameter data NP3, and the fourth parameter data NP4. Non-volatile memory 600 may be an example of—non-volatile memory 440 or other non-volatile memories disclosed in the varying embodiments of the present application.

Each parameter data may be data having a table structure. Each parameter data may correspond to particular log data. Referring to FIGS. 5 and 6, for example, the first parameter data NP1 may correspond to the first log data LD1, the second parameter data NP2 may correspond to the second log data LD2, the third parameter data NP3 may correspond to the third log data LD3, and the fourth parameter data NP4 may correspond to the fourth log data LD4.

In an embodiment, the first parameter data NP1 may include a parameter for a context of a NAND. For example, the parameters included in the first parameter data NP1 may be {0.5, 0.1, 0.4, 0.7, 0.3, 0.5, 0.3, 0.2, 0.1, 0.7, 0.5, 0.3, 0.5, 0.1, 0.1, 0.5}. However, the embodiment of the disclosure is not limited thereto.

In an embodiment, the second parameter data NP2 may include a parameter for a context of performance. For example, the parameter included in the second parameter data NP2 may be {0.3, 0.5, 0.2, 0.8, 0.1, 0.6, 0.6, 0.9}. However, the embodiment of the disclosure is not limited thereto.

In an embodiment, the third parameter data NP3 may include a parameter for a context of durability. For example, the parameter included in the second parameter data NP2 may be {0.4, 0.8, 0.2, 0.3, 0.1, 0.7, 0.5, 0.3, 0.6, 0.1, 0.7, 0.7}. However, the embodiment of the disclosure is not limited thereto.

In an embodiment, the fourth parameter data NP4 may include a parameter for the context of thermal. For example, the parameter included in the second parameter data NP2 may be {0.5, 0.9, 0.5, 0.7, 0.7, 0.1, 0.1, 0.1, 0.3, 0.3, 0.8, 0.3}. However, the embodiment of the disclosure is not limited thereto.

Figure 7:
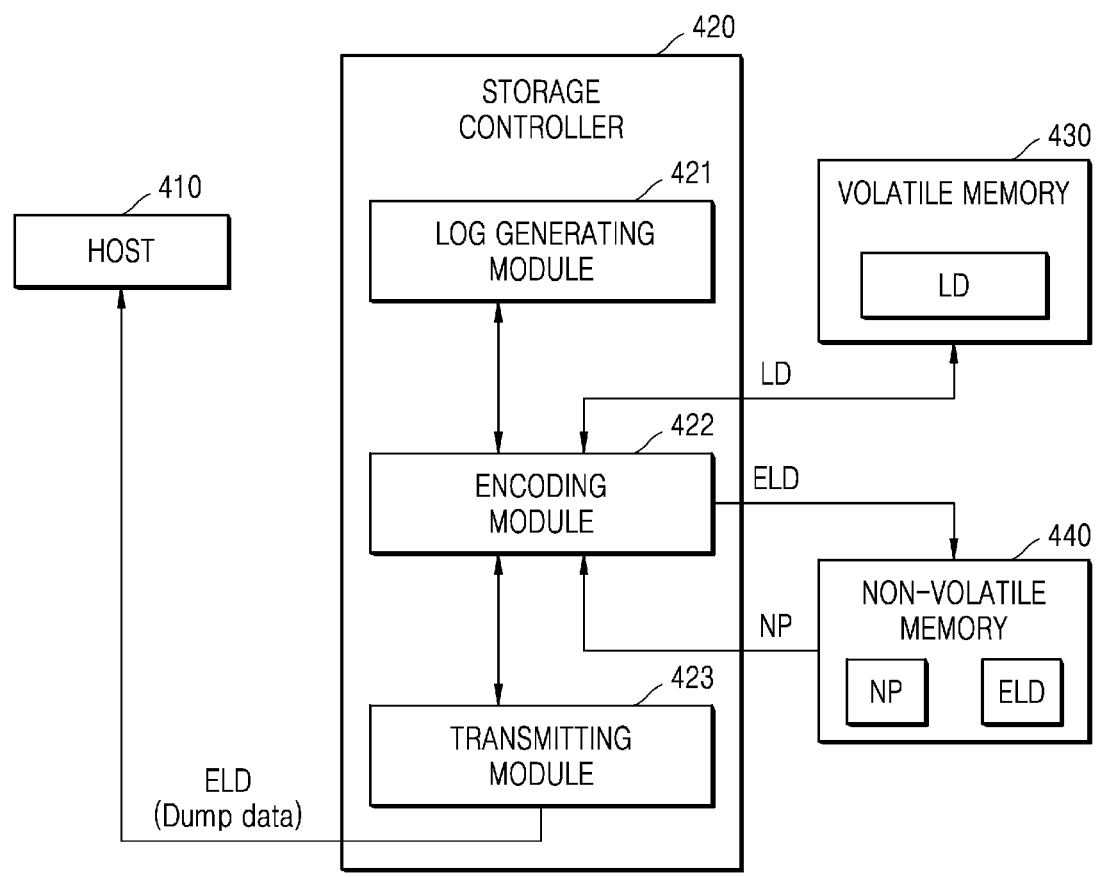
FIG. 7 is a diagram for describing a method for a storage device to encode log data and transmit the encoded log data according to an embodiment of the disclosure.

FIG. 7 is a diagram for describing a method for a storage device to encode log data and transmit the encoded log data according to an embodiment of the disclosure.

Referring to FIGS. 4 and 7, the log generating module 421 may output a signal indicating that the log data LD is stored in the volatile memory 430 through the bus.

The encoding module 422 may load the log data LD stored in the volatile memory 430. In particular, the encoding module 422 provides the read command and the first address to the volatile memory 430, the volatile memory 430 outputs log data LD stored in memory cells having a first address in response to a read command, and the encoding module 422 may temporarily store the log data LD in a register (not shown) included therein.

The encoding module 422 may load the parameter data NP stored in the non-volatile memory 440. In particular, the encoding module 422 provides the read command and the second address to the volatile memory 430, the volatile memory 430 outputs the parameter data NP stored in the memory cells having the second address in response to the read command, and the encoding module 422 may temporarily store the parameter data NP in a register. The loaded log data LD and parameter data NP may be used as inputs in the neural network.

The encoding module 422 may calculate a latent vector based on the loaded log data LD and the parameter data NP, and output data representing the latent vector as encoded log data ELD.

The encoding module 422 may provide the encoded log data ELD, the program command, and the third address to the non-volatile memory 440. The non-volatile memory 440 may store the encoded log data ELD in memory cells having a third address in response to a program command.

The encoding module 422 may output a signal indicating that the encoded log data ELD is stored in the non-volatile memory 440 through the bus.

The transmitting module 423 may transmit the encoded log data ELD as dump data to the host 410.

As described above, since the storage device transmits the compressed log data to the host, there is an effect of improving the data transmission speed between the host and the storage device.

Also, according to the above, as the storage device performs neural network-based encoding and pooling operations and transmits log data having a relatively small size to the host, there is an effect of reducing the workload of the host and reducing power consumed by the host.

In addition, according to the above-mentioned, by transmitting the log data based on the neural network to the host, the host accurately diagnoses the state of the storage device, predicts defects (or errors) that may occur in the storage device, and improves the performance of the storage device.

Figure 8:
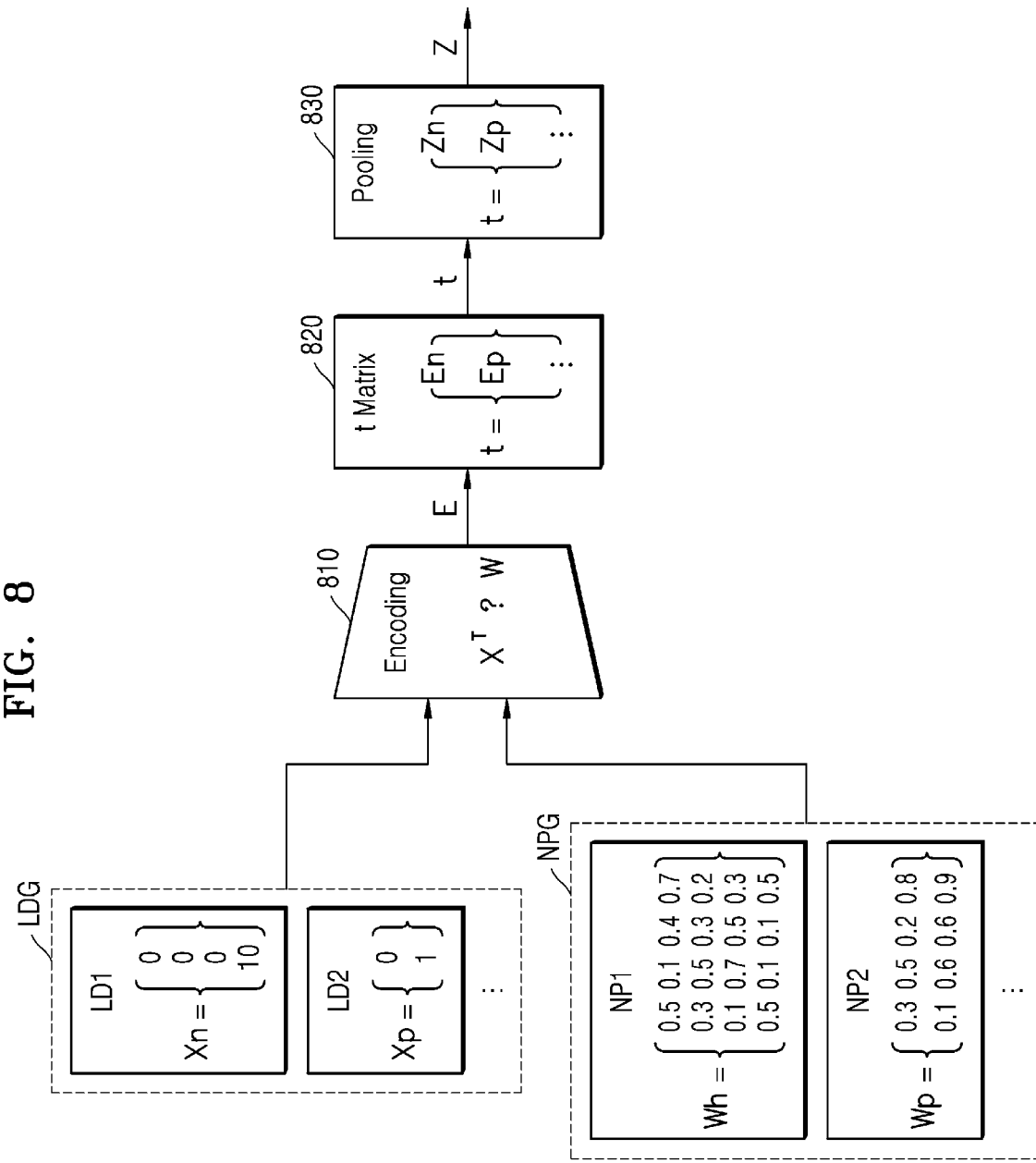
FIG. 8 is a diagram for explaining a method of calculating a latent vector according to an embodiment of the disclosure.

FIG. 8 is a diagram for explaining a method of calculating a latent vector according to an embodiment of the disclosure.

Referring to FIGS. 5, 6, 7, and 8, the log data group LDG may include a plurality of log data LD1, LD2, . . . . Hereinafter, the present embodiment will be described based on the first log data LD1 and the second log data LD2 for convenience.

For example, the first log data LD1 may correspond to a NAND context, and the second log data LD2 may correspond to a performance context. However, the embodiment of the disclosure is not limited thereto. In this case, the value of the context included in each log data may be expressed as a matrix. The matrix may be composed of N×M. N and M may be an integer of 1 or more. For example, when each value of Read Error Rate, Write Error Rate, Unrecoverable Write Errors, and Read Recovery Attempts included in the first log data LD1 is {0, 0, 0, 10}, the first context matrix Xn is a 4×1 matrix, and in the first matrix Xn, each element of the first to third rows may be 0 and the element of the fourth row may be 10. As another example, when the value of each of the throughput performance and the perf indicator included in the second log data LD2 is {0, 1}, the second context matrix Xp is a 2×1 matrix, and in the second matrix Xp, an element of a first row may be 0 and an element of a second row may be 1.

The parameter data group NPG may include a plurality of parameter data NP1, NP2, . . . . Hereinafter, the present embodiment will be described based on the first parameter data NP1 and the second parameter data NP2 for convenience.

The first parameter data NP1 may correspond to the first log data LD1, and the second parameter data NP2 may correspond to the second log data LD2. In this case, the value of the parameter included in each parameter data may be expressed as a matrix. The matrix may be composed of N×K. K may be an integer of 1 or more. For example, the parameter values included in the first parameter data NP1 may be {0.5, 0.1, 0.4, 0.7, 0.3, 0.5, 0.3, 0.2, 0.1, 0.7, 0.5, 0.3, 0.5, 0.1, 0.1, 0.5}. In this case, the first parameter matrix Wh is a 4×4 matrix, and in the first parameter matrix Wh, the elements of the first row may be [0.5 0.1 0.4 0.7] and the elements of the second row may be [0.3 0.5 0.3 0.2], and the elements in the third row may be [0.1 0.7 0.5 0.3], and the elements in the fourth row may be [0.5 0.1 0.1 0.5]. As another example, parameter values included in the second parameter data NP2 may be {0.3, 0.5, 0.2, 0.8, 0.1, 0.6, 0.6, 0.9}. In this case, the second parameter matrix Wp is a 2×4 matrix, and in the second parameter matrix Wp, the elements of the first row may be [0.3 0.5 0.2 0.8] and the elements of the second row may be [0.1 0.6 0.6 0.9]. However, the embodiment of the disclosure is not limited thereto.

In one embodiment, the encoding module 422 may include a single encoder 810, a matrix generator 820, and a pooling operator 830.

The single encoder 810 may perform a matrix multiplication operation on a parameter data group NPG and a log data group LDG, and may output operation result data indicating a result E of the matrix multiplication operation. In particular, the single encoder 810 may perform a matrix multiplication operation of a transpose matrix of each context matrix and each parameter matrix. In this case, the result E of the matrix multiplication operation may be generated for each matrix product between the transpose matrix of each context matrix and each parameter matrix as a matrix. For example, the single encoder 810 may perform a matrix multiplication operation of the transpose matrix of the first context matrix Xn and the first parameter matrix Wh, and may calculate the first operation result En. The first operation result En is a 1×4 matrix, and elements of the first operation result En may be [5 1 1 5]. Also, the single encoder 810 may perform a matrix multiplication operation of the transpose matrix of the second context matrix Xp and the second parameter matrix Wp, and may calculate the second operation result Ep. The second operation result Ep is a 1×4 matrix, and elements of the second operation result Ep may be [0.1 0.6 0.6 0.9].

The matrix generator 820 may receive operation result data and generate matrix data. The matrix data may be data representing one matrix t that constitutes the result E of the matrix multiplication operation as an element. For example, in one matrix t, a first row may be a first operation result En and a second row may be a second operation result Ep. However, the embodiment of the disclosure is not limited thereto.

The pooling operator 830 may calculate a latent vector z by performing a pooling operation based on matrix data. In particular, the pooling operator 830 may perform a pooling operation on the elements of each row in one matrix t, and calculate a latent vector z using the value calculated as a result of the pooling operation as an element. The pooling operation may be, for example, summing a number or concatenating a string. For example, since the elements of the first operation result En are [5 1 1 5], as a result of performing a pooling operation on the first operation result En, which is an element of the first row in one matrix t, the element Zn in the first row of the latent vector z may be 12 ("5+1+1+5"). And, since the elements of the second operation result Ep are [0.1 0.6 0.6 0.9], as a result of performing a pooling operation on the second operation result Ep, which is an element of the second row in one matrix t, the element Zp of the second row of the latent vector z may be 2.2("0.1+0.6+0.6+0.9").

The pooling operator 830 may output data representing the latent vector z as encoded log data ELD.

Figure 9:
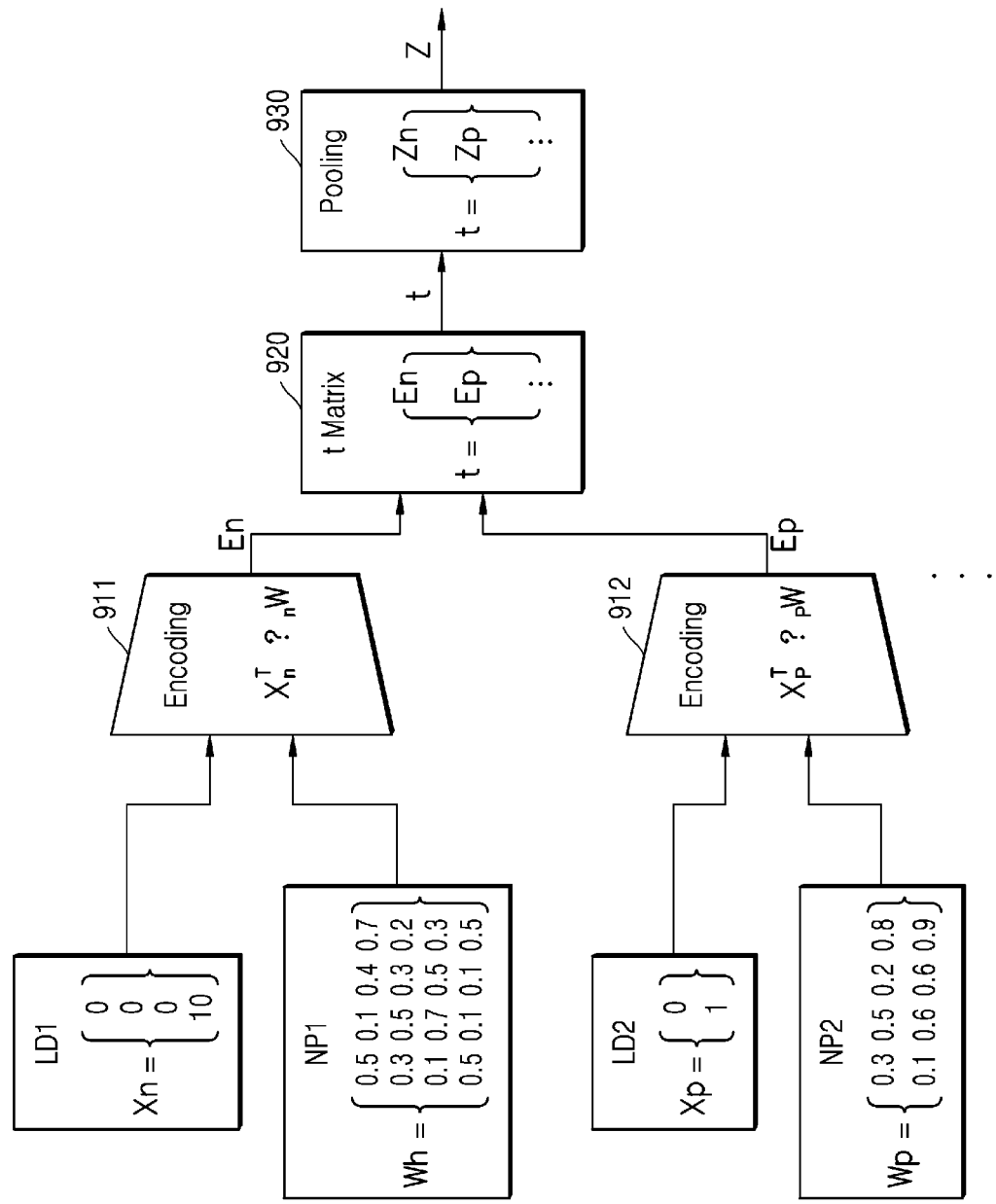
FIG. 9 is a view for explaining a method of calculating a latent vector according to another embodiment of the disclosure.

FIG. 9 is a view for explaining a method of calculating a latent vector according to another embodiment of the disclosure.

Referring to FIGS. 5, 6, 7 and 9, the encoding module 422 may include a plurality of encoders 911, 912, . . . , a matrix generator 920, and a pooling operator 930. Hereinafter, for convenience, it is assumed that the number of encoders is two.

The first encoder 911 may encode the first log data LD1. In particular, the first encoder 911 may perform a matrix multiplication operation on the first log data LD1 and the first parameter data NP1 and output first operation result data representing the first operation result En. As described above with reference to FIG. 8, the first operation result En is a 1×4 matrix, and elements of the first operation result En may be [5 1 1 5].

The second encoder 912 may perform a matrix multiplication operation on the second log data LD2 and the second parameter data NP2 and output second operation result data representing the second operation result Ep. As described above with reference to FIG. 8, the second operation result Ep is a 1×4 matrix, and elements of the second operation result Ep may be [0.1 0.6 0.6 0.9].

The matrix generator 920 may receive the first operation result data and the second operation result data, and generate matrix data representing one matrix t including an operation result of the first operation result data and an operation result of the second operation result data as elements. One matrix t is the same as that described above with reference to FIG. 8.

The pooling operator 930 performs a pooling operation on the operation result of the first operation result data and performs a pooling operation on the operation result of the second operation result data, based on the matrix data, to calculate a latent vector z.

Each operation of the matrix generator 920 and the pooling operator 930 shown in FIG. 9 is the same as that described above with reference to FIG. 8.

According to the embodiment shown in FIG. 9, the accuracy, precision, or sophistication of the encoding operation may be further increased compared to the embodiment shown in FIG. 8.

Figure 10:
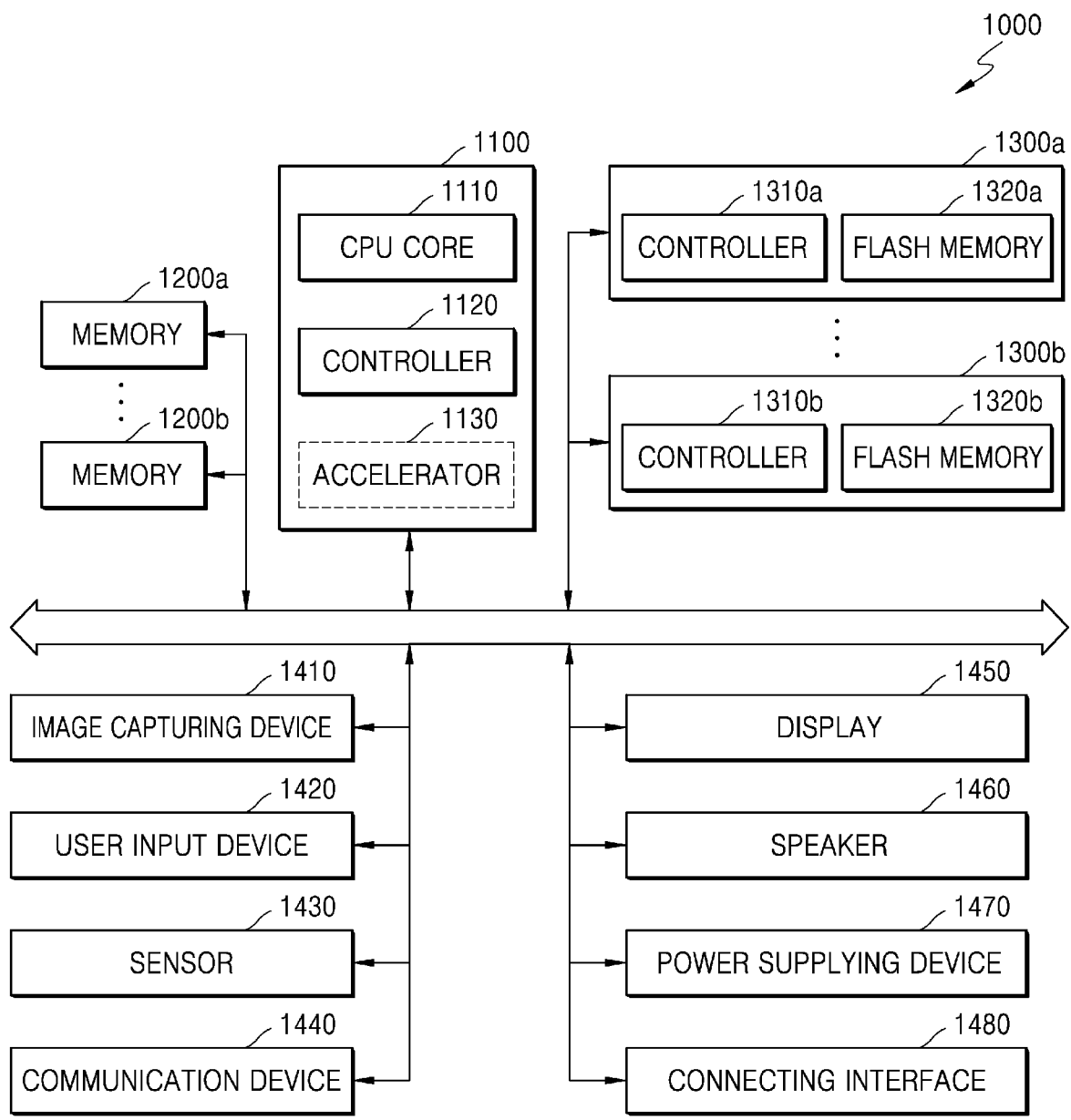
FIG. 10 is a diagram illustrating a system to which a storage device according to an embodiment of the disclosure is applied.

FIG. 10 is a diagram illustrating a system to which a storage device according to an embodiment of the disclosure is applied.

Referring to FIG. 10, a system 1000 may be a mobile system such as a mobile phone, a smart phone, a tablet personal computer, a wearable device, a healthcare device, or an Internet of things (IOT) device. However, the system 1000 is not necessarily limited to a mobile system, and may be a personal computer, a laptop computer, a server, a media player, or an automotive device such as a navigation device.

The system 1000 may include a main processor 1100, memories 1200a and 1200b, and storage devices 1300a and 1300b, and may further include one or more of an image capturing device 1410, user input device 1420, a sensor 1430, a communication device 1440, a display 1450, a speaker 1460, a power supplying device 1470 and a connecting interface 1480.

The main processor 1100 may control the overall operation of the system 1000, and more particularly, the operation of other components constituting the system 1000. The main processor 1100 may be implemented as a general-purpose processor, a dedicated processor, or an application processor.

The main processor 1100 may include one or more CPU cores 1110 and may further include a controller 1120 for controlling the memories 1200a and 1200b and/or the storage devices 1300a and 1300b. According to an embodiment, the main processor 1100 may further include an accelerator 1130 that is a dedicated circuit for high-speed data operation such as artificial intelligence (AI) data operation. Such an accelerator 1130 may include a graphics processing unit (GPU), a neural processing unit (NPU), and/or a data processing unit (DPU), and the like, and may be implemented as a separate chip physically independent from other components of the main processor 1100.

The memories 1200a and 1200b may be used as the main memory device of the system 1000 and may include volatile memories such as SRAM and/or DRAM, but include non-volatile memories such as flash memory, PRAM and/or RRAM. The memories 1200a and 1200b may be implemented in the same package as the main processor 1100.

The storage devices 1300a and 1300b may function as non-volatile storage devices that store data regardless of whether power is supplied or not, and may have a relatively large storage capacity compared to the memories 1200a and 1200b. The storage devices 1300a and 1300b include storage controllers 1310a and 1310b and non-volatile memories (NVMs) 1320a and 1320b for storing data under the control of the storage controllers 1310a and 1310b. The NVMs 1320a and 1320b may include a flash memory having a 2-dimensional (2D) structure or 3-dimensional (3D) Vertical NAND (V-NAND) structure, but may include other types of non-volatile memory such as PRAM and/or RRAM.

The storage devices 1300a and 1300b may be included in the system 1000 in a state physically separated from the main processor 1100, or may be implemented in the same package as the main processor 1100. In addition, the storage devices 1300a and 1300b may have the same shape as a solid state device (SSD) or a memory card, and thus, may be detachably coupled with other components of the system 1000 through an interface such as the connecting interface 1480 to be described later. The storage devices 1300a and 1300b may be devices to which standard protocols are applied, such as a Universal Flash Storage (UFS), an embedded multi-media card (eMMC), or a non-volatile memory express (NVMe), but are not necessarily limited thereto. The storage devices 1300a and 1300b may be controlled, and may include the various components, as described previously in connection with FIGS. 1-9.

The image capturing device 1410 may capture a still image or a moving image, and may be a camera, a camcorder, and/or a webcam. The user input device 1420 may receive various types of data input from a user of the system 1000, and may be a touch pad, a keypad, a keyboard, a mouse, and/or a microphone. The sensor 1430 may detect various types of physical quantities that may be obtained from the outside of the system 1000, and may convert the sensed physical quantities into electrical signals. Such a sensor 1430 may be a temperature sensor, a pressure sensor, an illuminance sensor, a position sensor, an acceleration sensor, a biosensor and/or a gyroscope sensor. The communication device 1440 may transmit and receive signals between other devices outside the system 1000 according to various communication protocols. Such a communication device 1440 may be implemented including an antenna, a transceiver, and/or a modem.

The display 1450 and the speaker 1460 may function as output devices that respectively output visual information and audio information to the user of the system 1000. The power supplying device 1470 may appropriately convert power supplied from a battery (not shown) built into the system 1000 and/or an external power source and supply the converted power to each component of the system 1000. The connecting interface 1480 may provide a connection between the system 1000 and an external device connected to the system 1000 to exchange data with the system 1000. The connecting interface 1480 may be implemented in various interface methods, such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, IEEE 1394, universal serial bus (USB), secure digital (SD) card, multi-media card (MMC), eMMC, UFS, embedded Universal Flash Storage (eUFS), and compact flash (CF) card interfaces.

Figure 11:
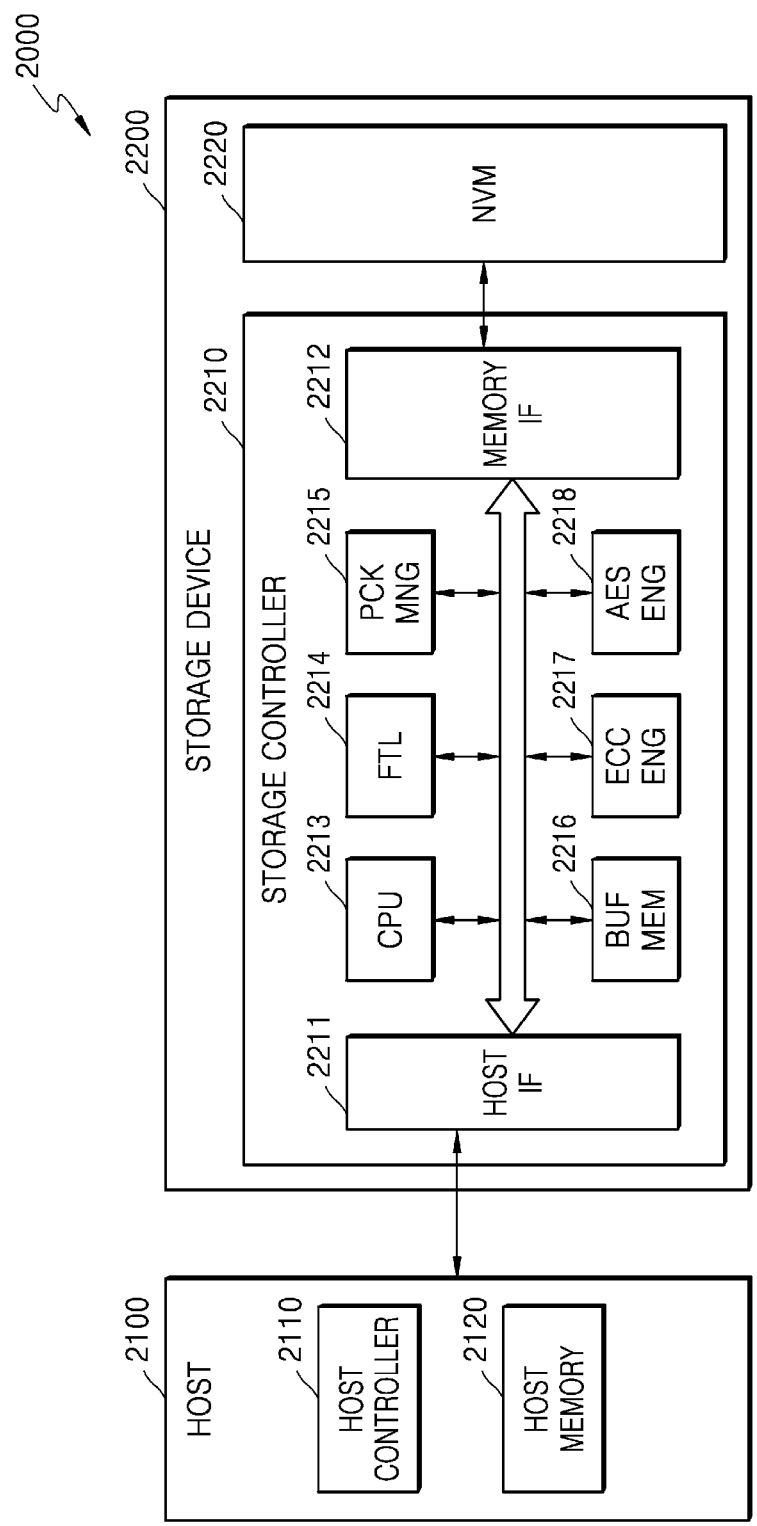
FIG. 11 is a block diagram illustrating a storage system according to another embodiment of the disclosure.

FIG. 11 is a block diagram illustrating a storage system according to another embodiment of the disclosure.

Referring to FIG. 11, a host-storage system 2000 may include a host 2100 and a storage device 2200. Also, the storage device 2200 may include a storage controller 2210 and a non-volatile memory (NVM) 2220. Also, according to an embodiment, the host 2100 may include a host controller 2110 and a host memory 2120. The host memory 2120 may function as a buffer memory for temporarily storing data to be transmitted to the storage device 2200 or data transmitted from the storage device 2200.

The storage device 2200 may include storage media for storing data according to a request from the host 2100. As an example, the storage device 2200 may include at least one of an SSD, an embedded memory, and a removable external memory. When the storage device 2200 is an SSD, the storage device 2200 may be a device conforming to a non-volatile memory express (NVMe) standard. If the storage device 2200 is an embedded memory or an external memory, the storage device 2200 may be a device conforming to universal flash storage (UFS) or embedded multimedia card (eMMC) standards. The host 2100 and the storage device 2200 may generate and transmit a packet according to an adopted standard protocol, respectively. The host 2100 and storage device 2200 may operate, and may include the various components, as described previously in connection with FIGS. 1-9.

When the NVM 2220 of the storage device 2200 includes a flash memory, the flash memory may include a 2D NAND memory array or a 3D (or vertical) NAND (VNAND) memory array. As another example, the storage device 2200 may include other various types of non-volatile memories. For example, a magnetic RAM (MRAM), a spin-transfer torque MRAM, a conductive bridging RAM (CBRAM), a ferroelectric RAM (FeRAM), a Phase RAM (PRAM), a resistive RAM, and other various types of memory may be applied to the storage device 2200.

According to an embodiment, the host controller 2110 and the host memory 2120 may be implemented as separate semiconductor chips. Alternatively, in some embodiments, the host controller 2110 and the host memory 2120 may be integrated on the same semiconductor chip. As an example, the host controller 2110 may be any one of a plurality of modules included in an application processor, and the application processor may be implemented as a system on chip (SoC). In addition, the host memory 2120 may be an embedded memory provided in the application processor or a non-volatile memory or memory module arranged outside the application processor.

The host controller 2110 may manage an operation of storing data (e.g., write data) of the buffer area of the host memory 2120 in the NVM 2220 or storing data (e.g., read data) of the NVM 2220 in the buffer area.

The storage controller 2210 may include a host interface 2211, a memory interface 2212, and a central processing unit (CPU) 2213. Also, the storage controller 2210 may further include a Flash Translation Layer (FTL) 2214, a packet manager (PCK MNG) 2215, a buffer memory (BUF MEM) 2216, an error correction code (ECC) engine (ECC ENG) 2217, and an advanced encryption standard (AES) engine (AES ENG) 2218. The storage controller 2210 may further include a working memory (not shown) into which the FTL 2214 is loaded, and the CPU 2213 executes the FTL 2214 to control write and read operations to the NVM 2220.

The host interface 2211 may transmit and receive packets to and from the host 2100. A packet transmitted from the host 2100 to the host interface 2211 may include a command or data to be stored in the NVM 2220, and the like, and a packet transmitted from the host interface 2211 to the host 2100 may include a response to a command or data read from the NVM 2220. The memory interface 2212 may transmit data to be stored in the NVM 2220 to the NVM 2220 or receive data read from the NVM 2220. The memory interface 2212 may be implemented to comply with a standard protocol such as toggle or Open NAND Flash Interface (ONFI).

The FTL 2214 may perform various functions such as address mapping, wear-leveling, and garbage collection. The address mapping operation is an operation of changing a logical address received from the host 2100 into a physical address used to actually store data in the NVM 2220. Wear-leveling is a technique for preventing excessive deterioration of a specific block by allowing blocks in the NVM 2220 to be used uniformly, and for example, may be implemented through a firmware technique that balances erase counts of physical blocks. Garbage collection is a technique for securing usable capacity in the NVM 2220 by copying valid data of a block to a new block and then erasing an existing block.

The packet manager 2215 may generate a packet according to the protocol of the interface negotiated with the host 2100 or parse various information from the packet received from the host 2100. Also, the buffer memory 2216 may temporarily store data to be stored in the NVM 2220 or data to be read from the NVM 2220. The buffer memory 2216 may be provided in the storage controller 2210, but may be arranged outside the storage controller 2210.

The ECC engine 2217 may perform an error detection and correction function for read data read from the NVM 2220. In particular, the ECC engine 2217 may generate parity bits for write data to be stored in the NVM 2220, and the generated parity bits may be stored in the NVM 2220 together with the write data. When reading data from the NVM 2220, the ECC engine 2217 may correct an error in the read data using parity bits read from the NVM 2220 together with the read data, and may output the error-corrected read data.

The AES engine 2218 may perform at least one of an encryption operation and a decryption operation on data input to the storage controller 2210 using a symmetric-key algorithm.

Figure 12:
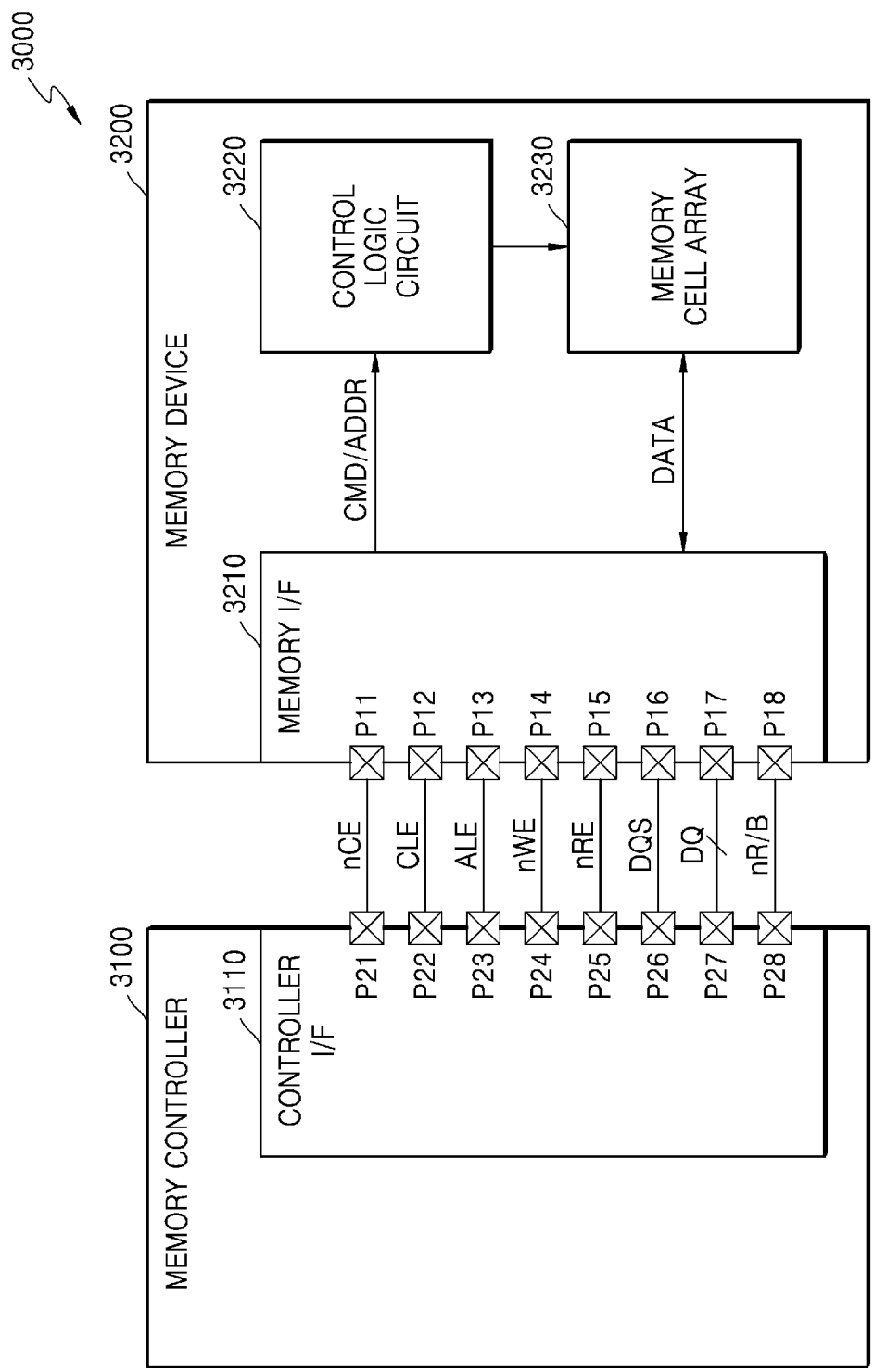
FIG. 12 is a block diagram illustrating a memory system according to an embodiment of the disclosure.

FIG. 12 is a block diagram illustrating a memory system according to an embodiment of the disclosure.

Referring to FIG. 12, a memory system 3000 may include a memory device 3200 and a memory controller 3100. The memory device 3200 may correspond to one of non-volatile memory devices communicating with the memory controller 3100 based on one of a plurality of channels. The memory controller 3100 and memory device 3200 may operate, and may include the various components described previously in connection with FIGS. 1-9.

The memory device 3200 may include first to eighth pins P11 to P18, a memory interface circuit 3210, a control logic circuit 3220, and a memory cell array 3230. The memory interface circuit 3210 may receive the chip enable signal nCE from the memory controller 3100 through the first pin P11. The memory interface circuit 3210 may transmit/receive signals to/from the memory controller 3100 through the second to eighth pins P12 to P18 according to the chip enable signal nCE. For example, when the chip enable signal nCE is in an enable state (e.g., low level), the memory interface circuit 3210 may transmit/receive signals to/from the memory controller 3100 through the second to eighth pins P12 to P18.

The memory interface circuit 3210 may receive a command latch enable signal CLE, an address latch enable signal ALE, and a write enable signal nWE from the memory controller 3100 through the second to fourth pins P12 to P14. The memory interface circuit 3210 may receive the data signal DQ from the memory controller 3100 or transmit the data signal DQ to the memory controller 3100 through the seventh pin P17. A command CMD, an address ADDR, and data DATA may be transmitted through the data signal DQ. For example, the data signal DQ may be transmitted through a plurality of data signal lines. In this case, the seventh pin P17 may include a plurality of pins corresponding to a plurality of data signals.

The memory interface circuit 3210 may obtain the command CMD from the data signal DQ received in the enable section (e.g., high level state) of the command latch enable signal CLE based on the toggle timings of the write enable signal nWE. The memory interface circuit 3210 may obtain the address ADDR from the data signal DQ received in the enable section (e.g., high level state) of the address latch enable signal ALE based on the toggle timings of the write enable signal nWE.

In an example embodiment, the write enable signal nWE may be toggled between a high level and a low level while maintaining a static state (e.g., a high level or a low level). For example, the write enable signal nWE may be toggled in a section in which the command CMD or the address ADDR is transmitted. Accordingly, the memory interface circuit 3210 may acquire the command CMD or the address ADDR based on the toggle timings of the write enable signal nWE.

The memory interface circuit 3210 may receive the read enable signal nRE from the memory controller 3100 through the fifth pin P15. The memory interface circuit 3210 may receive the data strobe signal DQS from the memory controller 3100 or transmit the data strobe signal DQS to the memory controller 3100 through the sixth pin P16.

In the data output operation of the memory device 3200, the memory interface circuit 3210 may receive the read enable signal nRE toggling through the fifth pin P15 before outputting the data DATA. The memory interface circuit 3210 may generate a toggling data strobe signal DQS based on the toggling of the read enable signal nRE. For example, the memory interface circuit 3210 may generate a data strobe signal DQS that starts toggling after a preset delay (e.g., tDQSRE) based on a toggling start time of the read enable signal nRE. The memory interface circuit 3210 may transmit the data signal DQ including the data DATA based on the toggle timing of the data strobe signal DQS. Accordingly, the data DATA may be aligned with the toggle timing of the data strobe signal DQS and transmitted to the memory controller 3100.

In the data input operation of the memory device 3200, when the data signal DQ including the data DATA is received from the memory controller 3100, the memory interface circuit 3210 may receive the data strobe signal DQS toggling together with the data DATA from the memory controller 3100. The memory interface circuit 3210 may acquire data DATA from the data signal DQ based on the toggle timing of the data strobe signal DQS. For example, the memory interface circuit 3210 may acquire the data DATA by sampling the data signal DQ at rising edges and falling edges of the data strobe signal DQS.

The memory interface circuit 3210 may transmit the ready/busy output signal nR/B to the memory controller 3100 through the eighth pin P18. The memory interface circuit 3210 may transmit state information of the memory device 3200 to the memory controller 3100 through the ready/busy output signal nR/B. When the memory device 3200 is in a busy state (i.e., when internal operations of the memory device 3200 are being performed), the memory interface circuit 3210 may transmit a ready/busy output signal nR/B indicating a busy state to the memory controller 3100. When the memory device 3200 is in a ready state (i.e., when internal operations of the memory device 3200 are not performed or completed), the memory interface circuit 3210 may transmit a ready/busy output signal nR/B indicating a ready state to the memory controller 3100. For example, while the memory device 3200 reads data DATA from the memory cell array 3230 in response to a page read command, the memory interface circuit 3210 may transmit a ready/busy output signal nR/B indicating a busy state (e.g., a low level) to the memory controller 3100. For example, while the memory device 3200 programs data DATA into the memory cell array 3230 in response to a program command, the memory interface circuit 3210 may transmit a ready/busy output signal nR/B indicating a busy state to the memory controller 3100.

The control logic circuit 3220 may generally control various operations of the memory device 3200. The control logic circuit 3220 may receive a command/address CMD/ADDR obtained from the memory interface circuit 3210. The control logic circuit 3220 may generate control signals for controlling other components of the memory device 3200 according to the received command/address CMD/

ADDR. For example, the control logic circuit 3220 may generate various control signals for programming data DATA in the memory cell array 3230 or reading data DATA from the memory cell array 3230.

The memory cell array 3230 may store data DATA obtained from the memory interface circuit 3210 under the control of the control logic circuit 3220. The memory cell array 3230 may output the stored data DATA to the memory I/F 3210 under the control of the control logic circuit 3220.

The memory cell array 3230 may include a plurality of memory cells. For example, the plurality of memory cells may be flash memory cells. However, the embodiment of the disclosure is not limited thereto, and the memory cells may be one of resistive random access memory (RRAM) cells, ferroelectric random access memory (FRAM) cells, phase change random access memory (PRAM) cells, thyristor random access memory (TRAM) cells, or magnetic random access memory (MRAM) cells. Hereinafter, description will focus on embodiments in which memory cells are NAND flash memory cells.

The memory controller 3100 may include first to eighth pins P21 to P28 and a controller interface circuit 3110. The first to eighth pins P21 to P28 may correspond to the first to eighth pins P11 to P18 of the memory device 3200. The controller interface circuit 3110 may transmit the chip enable signal nCE to the memory device 3200 through the first pin P21. Through the second to eighth pins P22 to P28, the controller interface circuit 3110 may transmit/receive signals to/from the memory device 3200 selected through the chip enable signal nCE.

The controller interface circuit 3110 may transmit a command latch enable signal CLE, an address latch enable signal ALE, and a write enable signal nWE to the memory device 3200 through the second to fourth pins P22 to P24. The controller interface circuit 3110 may transmit the data signal DQ to the memory device 3200 or receive the data signal DQ from the memory device 3200 through the seventh pin P27.

The controller interface circuit 3110 may transmit a data signal DQ including a command CMD or an address ADDR together with a toggle write enable signal nWE to the memory device 3200. As the command latch enable signal CLE having an enable state is transmitted, the controller interface circuit 3110 transmits a data signal DQ including a command CMD to the memory device 3200, and as the address latch enable signal ALE having an enable state is transmitted, the controller interface circuit 3110 may transmit the data signal DQ including the address ADDR to the memory device 3200.

The controller interface circuit 3110 may transmit the read enable signal nRE to the memory device 3200 through the fifth pin P25. The controller interface circuit 3110 may receive the data strobe signal DQS from the memory device 3200 or may transmit the data strobe signal DQS to the memory device 3200 through the sixth pin P26.

In the data output operation of the memory device 3200, the controller interface circuit 3110 may generate a toggle read enable signal nRE and transmit the read enable signal nRE to the memory device 3200. For example, the controller interface circuit 3110 may generate a read enable signal nRE that is changed from a fixed state (e.g., high level or low level) to a toggle state before data DATA is output. Accordingly, the data strobe signal DQS toggling based on the read enable signal nRE in the memory device 3200 may be generated. The controller interface circuit 3110 may receive the data signal DQ including the data DATA together with the toggling data strobe signal DQS from the memory device 3200. The controller interface circuit 3110 may acquire data DATA from the data signal DQ based on the toggle timing of the data strobe signal DQS.

In a data input operation of the memory device 3200, the controller interface circuit 3110 may generate a toggle data strobe signal DQS. For example, the controller interface circuit 3110 may generate a data strobe signal DQS that changes from a fixed state (e.g., high level or low level) to a toggle state before transmitting data DATA. The controller interface circuit 3110 may transmit the data signal DQ including the data DATA to the memory device 3200 based on the toggle timings of the data strobe signal DQS. The controller interface circuit 3110 may receive the ready/busy output signal nR/B from the memory device 3200 through the eighth pin P28. The controller interface circuit 3110 may determine state information of the memory device 3200 based on the ready/busy output signal nR/B.

Figure 13:
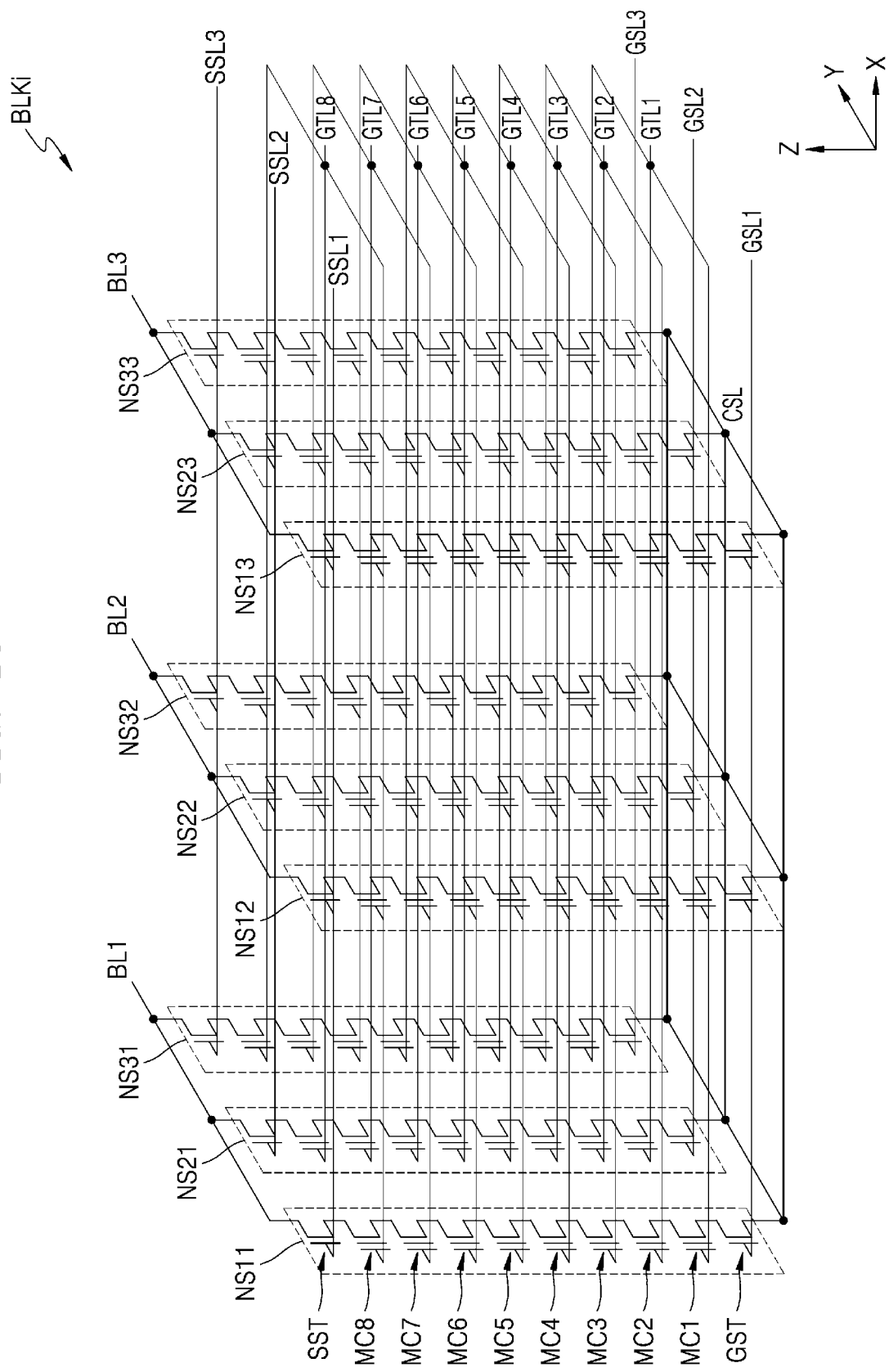
FIG. 13 is a diagram for explaining a 3D VNAND structure according to an embodiment of the disclosure.

FIG. 13 is a diagram for explaining a 3D VNAND structure according to an embodiment of the disclosure.

Figure 14:
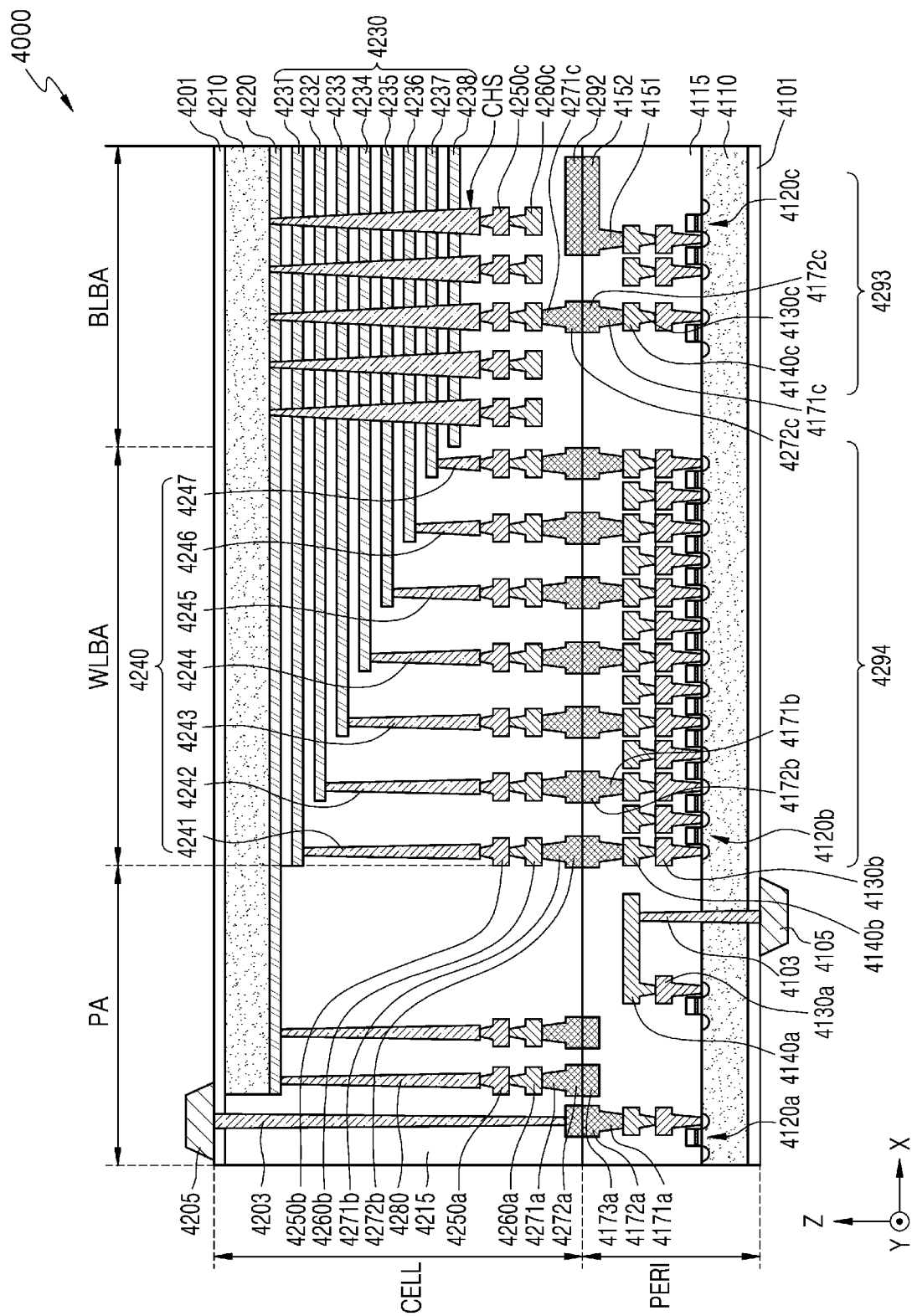
FIG. 14 is a diagram for explaining a BVNAND structure according to an embodiment of the disclosure.

Referring to FIG. 13, when the non-volatile memory is implemented as a 3D VNAND type flash memory, each of the plurality of memory blocks constituting the storage module may be represented by an equivalent circuit as shown in FIG. 14. A memory block BLKi represents a 3D memory block formed in a three-dimensional structure on a substrate. For example, the plurality of memory NAND strings included in the memory block BLKi may be formed in a direction perpendicular to the substrate.

The memory block BLKi may include a plurality of memory NAND strings NS11 to NS33 connected between bit lines BL1, BL2, and BL3 and the common source line CSL. Each of the plurality of memory NAND strings NS11 to NS33 may include a string select transistor SST, a plurality of memory cells MC1, MC2, . . . , MC8, and a ground select transistor GST. In FIG. 14, each of the plurality of memory NAND strings NS11 to NS33 is illustrated as including eight memory cells MC1, MC2, . . . , MC8, but is not limited thereto.

The string select transistor SST may be connected to the corresponding string select lines SSL1, SSL2, and SSL3. The plurality of memory cells MC1, MC2, . . . , MC8 may be respectively connected to corresponding gate lines GTL1, GTL2, . . . , GTL8. The gate lines GTL1, GTL2, . . . , GTL8 may correspond to word lines, and some of the gate lines GTL1, GTL2, . . . , GTL8 may correspond to dummy word lines. The ground select transistor GST may be connected to the corresponding ground select lines GSL1, GSL2, and GSL3. The string select transistor SST may be connected to the corresponding bit lines BL1, BL2, and BL3, and the ground select transistor GST may be connected to the common source line CSL.

Word lines (e.g., GTL1) of the same height may be commonly connected, and the ground select lines GSL1, GSL2, and GSL3 and the string select lines SSL1, SSL2, and SSL3 may be separated from each other. In FIG. 14, the memory block BLKi is illustrated as being connected to the eight gate lines GTL1, GTL2, . . . , GTL8 and the three bit lines BL1, BL2, and BL3 is illustrated, but is not limited thereto. The non-volatile memory of FIG. 14 may be used as the non-volatile memory 130 of FIG. 1, the flash memory 1320*a* and/or 1320*b* of FIG. 10, the NVM 2220 of FIG. 11, or the memory cell array 3230 of FIG. 12.

FIG. 14 is a diagram for explaining a Bonding Vertical NAND (B-VNAND) structure according to an embodiment of the disclosure.

Referring to FIG. 14, when the non-volatile memory is implemented as a B-VNAND type flash memory, the non-volatile memory may have the structure shown in FIG. 14. The non-volatile memory of FIG. 14 may be used as the non-volatile memory 130 of FIG. 1, the flash memory 1320a and/or 1320b of FIG. 10, the NVM 2220 of FIG. 11, or the memory cell array 3230 of FIG. 12, and may be used to implement the non-volatile memory of FIG. 13.

The memory device 4000 may have a chip to chip (C2C) structure. The C2C structure may mean connecting an upper chip and a lower chip to each other by a bonding method after manufacturing the upper chip including the cell area CELL on the first wafer, and manufacturing the lower chip including the peripheral circuit area PERI on a second wafer different from a first wafer. For example, the bonding method may refer to a method of electrically connecting the bonding metal formed in the uppermost metal layer of the upper chip and the bonding metal formed in the uppermost metal layer of the lower chip to each other. For example, when the bonding metal is formed of copper (Cu), the bonding method may be a Cu—Cu bonding method, and the bonding metal may also be formed of aluminum or tungsten.

Each of the peripheral circuit area PERI and the cell area CELL of the memory device 4000 may include an external pad bonding area PA, a word line bonding area WLBA, and a bit line bonding area BLBA.

The peripheral circuit area PERI may include a first substrate 4110, an interlayer insulating layer 4115, a plurality of circuit elements 4120a, 4120b, and 4120c formed on the first substrate 4110, a plurality of first metal layers 4130a, 4130b, and 4130c respectively connected to the plurality of circuit elements 4120a, 4120b, 4120c, and a plurality of second metal layers 4140a, 4140b, and 4140c formed on the plurality of first metal layers 4130a, 4130b, and 4130c. In one embodiment, the first metal layers 4130a, 4130b, and 4130c may be formed of tungsten having a relatively high resistance, and the second metal layers 4140a, 4140b, and 4140c may be formed of copper having a relatively low resistance.

In the present specification, only the first metal layers 4130a, 4130b, and 4130c and the second metal layers 4140a, 4140b, and 4140c are illustrated and described, but the embodiment of the disclosure is not limited thereto, and at least one metal layer may be further formed on the second metal layers 4140a, 4140b, and 4140c. At least some of the one or more metal layers formed on the second metal layers 4140a, 4140b, and 4140c may be formed of aluminum or the like having a lower resistance than copper forming the second metal layers 4140a, 4140b, and 4140c.

The interlayer insulating layer 4115 is arranged on the first substrate 4110 to cover the plurality of circuit elements 4120a, 4120b, and 4120c, the first metal layers 4130a, 4130b, and 4130c, and the second metal layers 4140a, 4140b, and 4140c and may include an insulating material such as silicon oxide, silicon nitride, or the like.

Lower bonding metals 4171b and 4172b may be formed on the second metal layer 4140b of the word line bonding area WLBA. In the word line bonding area WLBA, the lower bonding metals 4171b and 4172b of the peripheral circuit area PERI may be electrically connected to each other by a bonding method with the upper bonding metals 4271b and 4272b of the cell area CELL, and the lower bonding metals 4171b and 4172b and the upper bonding metals 4271b and 4272b may be formed of aluminum, copper, tungsten, or the like.

The cell area CELL may provide at least one memory block. The cell area CELL may include a second substrate 4210 and a common source line 4220. A plurality of word lines 4231 to 4238 (i.e., 4230) may be stacked on the second substrate 4210 in a direction (Z-axis direction) perpendicular to the upper surface of the second substrate 4210. String select lines and ground select lines may be arranged on each of the upper and lower portions of the word lines 4230, and the plurality of word lines 4230 may be arranged between the string select lines and the ground select line.

In the bit line bonding area BLBA, the channel structure CH CHS may extend in a direction perpendicular to the upper surface of the second substrate 4210 to pass through the word lines 4230, the string select lines, and the ground select line. The channel structure CHS may include a data storage layer, a channel layer, and a buried insulating layer, and the channel layer may be electrically connected to the first metal layer 4250c and the second metal layer 4260c. For example, the first metal layer 4250c may be a bit line contact, and the second metal layer 4260c may be a bit line. In an embodiment, the bit line 4260c may extend along a first direction (Y-axis direction) parallel to the upper surface of the second substrate 4210.

An area in which the channel structure CHS and the bit line 4260c are arranged may be defined as the bit line bonding area BLBA. The bit line 4260c may be electrically connected to the circuit elements 4120c providing the page buffer 4293 in the peripheral circuit area PERI in the bit line bonding area BLBA. For example, the bit line 4260c may be connected to the upper bonding metals 4271c and 4272c in the peripheral circuit area PERI, and the upper bonding metals 4271c and 4272c may be connected to the lower bonding metals 4171c and 4172c connected to the circuit elements 4120c of the page buffer 4293.

In the word line bonding area WLBA, the word lines 4230 may extend in a second direction (X-axis direction) parallel to the upper surface of the second substrate 4210, and may be connected to a plurality of cell contact plugs 4241 to 4247 (i.e., 4240). The word lines 4230 and the cell contact plugs 4240 may be connected to each other by pads provided by extending at least some of the word lines 4230 to different lengths along the second direction. The first metal layer 4250b and the second metal layer 4260b may be sequentially connected to the upper portions of the cell contact plugs 4240 connected to the word lines 4230. The cell contact plugs 4240 may be connected to the peripheral circuit area PERI through the upper bonding metals 4271b and 4272b of the cell area CELL and the lower bonding metals 4171b and 4172b of the peripheral circuit area PERI in the word line bonding area WLBA.

The cell contact plugs 4240 may be electrically connected to the circuit elements 4120b providing the row decoder 4294 in the peripheral circuit area PERI. In an embodiment, operating voltages of the circuit elements 4120b providing the row decoder 4294 may be different from the operating voltages of the circuit elements 4120c providing the page buffer 4293. For example, the operating voltages of the circuit elements 4120c providing the page buffer 4293 may be greater than the operating voltages of the circuit elements 4120b providing the row decoder 4294.

A common source line contact plug 4280 may be arranged in the outer pad bonding area PA. The common source line contact plug 4280 is formed of a conductive material such as a metal, a metal compound, or polysilicon, and may be electrically connected to the common source line 4220. A first metal layer 4250a and a second metal layer 4260a may be sequentially stacked on the common source line contact plug 4280. For example, an area where the common source line contact plug 4280, the first metal layer 4250a, and the second metal layer 4260a are arranged may be defined as an outer pad bonding area PA.

Meanwhile, input/output pads 4105 and 4205 may be arranged in the outer pad bonding area PA. A lower insulating film 4101 covering the lower surface of the first substrate 4110 may be formed under the first substrate 4110, and a first input/output pad 4105 may be formed on the lower insulating film 4101. The first input/output pad 4105 may be connected to at least one of the plurality of circuit elements 4120a, 4120b, and 4120c arranged in the peripheral circuit area PERI through the first input/output contact plug 4103, and may be separated from the first substrate 4110 by the lower insulating film 4101. In addition, a side insulating film may be arranged between the first input/output contact plug 4103 and the first substrate 4110 to electrically separate the first input/output contact plug 4103 from the first substrate 4110.

An upper insulating film 4201 covering the upper surface of the second substrate 4210 may be formed on the second substrate 4210, and a second input/output pad 4205 may be arranged on the upper insulating film 4201. The second input/output pad 4205 may be connected to at least one of the plurality of circuit elements 4120a, 4120b, and 4120c arranged in the peripheral circuit area PERI through the second input/output contact plug 4203.

According to embodiments, the second substrate 4210 and the common source line 4220 may not be arranged in an area where the second input/output contact plug 4203 is arranged. Also, the second input/output pad 4205 may not overlap with the word lines 4230 in the third direction (Z-axis direction). The second input/output contact plug 4203 may be separated from the second substrate 4210 in a direction parallel to the upper surface of the second substrate 4210, and may be connected to the second input/output pad 4205 through the interlayer insulating layer 4215 of the cell area CELL.

According to embodiments, the first input/output pad 4105 and the second input/output pad 4205 may be selectively formed. For example, the memory device 4000 may include only the first input/output pad 4105 arranged on the first substrate 4110, or may include only the second input/output pad 4205 arranged on the second substrate 4210. Alternatively, the memory device 4000 may include both the first input/output pad 4105 and the second input/output pad 4205.

In each of the outer pad bonding area PA and the bit line bonding area BLBA respectively included in the cell area CELL and the peripheral circuit area PERI, the metal pattern of the uppermost metal layer may exist as a dummy pattern, or the uppermost metal layer may be empty.

In relation to the memory device 4000, a lower metal pattern 4176a having the same shape as the upper metal pattern 4272a of the cell area CELL may be formed on the uppermost metal layer of the peripheral circuit area PERI in correspondence to the upper metal pattern 4272a formed on the uppermost metal layer of the cell area CELL in the outer pad bonding area PA. The lower metal pattern 4176a formed on the uppermost metal layer of the peripheral circuit area PERI may not be connected to a separate contact in the peripheral circuit area PERI. Similarly, in correspondence to the lower metal pattern formed on the uppermost metal layer of the peripheral circuit area PERI in the outer pad bonding area PA, an upper metal pattern having the same shape as the lower metal pattern of the peripheral circuit area PERI may be formed on the upper metal layer of the cell area CELL.

Lower bonding metals 4171b and 4172b may be formed on the second metal layer 4140b of the word line bonding area WLBA. In the word line bonding area WLBA, the lower bonding metals 4171b and 4172b of the peripheral circuit area PERI may be electrically connected to the upper bonding metals 4271b and 4272b of the cell area CELL by a bonding method.

Also, in the bit line bonding area BLBA, in correspondence to the lower metal pattern 4152 formed on the uppermost metal layer of the peripheral circuit area PERI, an upper metal pattern 4292 having the same shape as the lower metal pattern 4152 of the peripheral circuit area PERI may be formed on the uppermost metal layer of the cell area CELL. A contact may not be formed on the upper metal pattern 4292 formed on the uppermost metal layer of the cell area CELL.

While aspects of the inventive concept have been particularly shown and described with reference to embodiments thereof, it will be understood that various changes in form and details may be made therein without departing from the spirit and scope of the following claims.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

What is claimed is:

1. A storage device including a plurality of components, the storage device comprising:
   a memory configured to store parameter data used as an input in a neural network, the parameter data including first parameter data and second parameter data; and
   a storage controller configured to
     generate, based on a received request signal from a host, log data that includes first log data corresponding to a context of a first component among the plurality of components and second log data corresponding to a context of a second component among the plurality of components,
     perform a first matrix multiplication operation on the first log data and the first parameter data, and output first operation result data representing a result of the first matrix multiplication operation,
     perform a second matrix multiplication operation on the second log data and the second parameter data, and output second operation result data representing a result of the second matrix multiplication operation, generate matrix data representing one matrix including, as elements, an operation result of the first operation result data and an operation result of the second operation result data, calculate a latent vector by performing a pooling operation on the operation result of the first operation result data and performing a pooling operation on the operation result of the second operation result data, output data representing the latent vector as encoded log data, and transmit the encoded log data to the host.

2. The storage device of claim 1, wherein the storage controller comprises:
   a log generating module configured to generate the log data;
   an encoding module configured to calculate the latent vector and output the data representing the latent vector as the encoded log data; and
   a transmitting module configured to transmit the encoded log data to the host.

3. The storage device of claim 2, wherein the log generating module is configured to control the memory to store the log data.

4. The storage device of claim 3, wherein the encoding module is configured to
   load the log data stored in the memory, and
   control the memory to store data representing the latent vector.

5. The storage device of claim 2, wherein the encoding module comprises:
   an encoder configured to perform the first matrix multiplication operation and the second matrix multiplication operation;
   a matrix generator configured to generate the matrix data; and
   a pooling operator configured to calculate the latent vector.

6. The storage device of claim 1, wherein the request signal comprises a data pointer and a first command double word, and
   wherein the first command double word comprises bit information corresponding to telemetry host-initiated.

7. A storage device including a plurality of components, the storage device comprising:
   a memory configured to store parameter data used as an input in a neural network, the parameter data including first parameter data and second parameter data; and
   a storage controller configured to
      generate log data that includes first log data corresponding to a context of a first component among the plurality of components and second log data corresponding to a context of a second component among the plurality of components,
      perform a first matrix multiplication operation on the first log data and the first parameter data, and output first operation result data representing a result of the first matrix multiplication operation,
      perform a second matrix multiplication operation on the second log data and the second parameter data, and output second operation result data representing a result of the second matrix multiplication operation,
      generate matrix data representing one matrix including, as elements, an operation result of the first operation result data and an operation result of the second operation result data,
      calculate a latent vector by performing a pooling operation on the operation result of the first operation result data and performing a pooling operation on the operation result of the second operation result data,
      output data representing the latent vector as encoded log data,
      and
      control the memory to store the encoded log data.

8. The storage device of claim 7, wherein the storage controller comprises:
   a log generating module configured to generate the log data; and
   an encoding module configured to calculate the latent vector and control the memory to store the data representing the latent vector as the encoded log data.

9. The storage device of claim 8, wherein the log generating module is configured to control the memory to store the log data.

10. The storage device of claim 9, wherein the encoding module is configured to load the log data stored in the memory.

11. The storage device of claim 8, wherein the encoding module comprises:
    an encoder configured to perform the first matrix multiplication operation and the second matrix multiplication operation;
    a matrix generator configured to generate the matrix data; and
    a pooling operator configured to calculate the latent vector.

12. The storage device of claim 7, wherein the encoded log data has a size less than a size of the log data.

13. A storage device including a plurality of components, the storage device comprising:
    a first memory configured to store log data for contexts of the plurality of components;
    a second memory configured to store parameter data used as an input in a neural network; and
    a storage controller includes
       a log generating module configured to generate, based on a received request signal from a host, the log data and control the first memory to store the log data,
       an encoding module configured to load the log data from the first memory, load the parameter data from the second memory, calculate a latent vector based on the loaded parameter data and the loaded log data, and output data representing the latent vector as encoded log data, and
       a transmitting module configured to transmit the encoded log data to the host,
    wherein the request signal comprises a data pointer and a first command double word, and
    wherein the first command double word comprises bit information corresponding to telemetry host-initiated.

14. The storage device of claim 13, wherein the encoding module is configured to control the second memory to store the encoded log data.

15. The storage device of claim 13, wherein the first memory comprises a volatile memory, and
    wherein the second memory comprises a non-volatile memory.

16. The storage device of claim 13, wherein the encoding module comprises:
    an encoder configured to perform a matrix multiplication operation on the parameter data and the log data, and output operation result data representing a result of the matrix multiplication operation;

a matrix generator configured to receive the operation result data and generate matrix data representing one matrix constituting the result of the matrix multiplication operation as an element; and a pooling operator configured to calculate the latent vector by performing a pooling operation based on the matrix data.

* * * * *